United States Patent
Njemanze et al.

(10) Patent No.: US 8,230,507 B1
(45) Date of Patent: *Jul. 24, 2012

(54) MODULAR AGENT FOR NETWORK SECURITY INTRUSION DETECTION SYSTEM

(75) Inventors: Hugh S. Njemanze, Redwood City, CA (US); Hector Aguilar-Macias, San Jose, CA (US); Qiang Zeng, Fremont, CA (US); Christian Friedrich Beedgen, Cupertino, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 64 days.

This patent is subject to a terminal disclaimer.

(21) Appl. No.: 12/791,556

(22) Filed: Jun. 1, 2010

Related U.S. Application Data

(63) Continuation of application No. 10/308,548, filed on Dec. 2, 2002, now Pat. No. 7,788,722.

(51) Int. Cl.
    G06F 11/00 (2006.01)
(52) U.S. Cl. .................................................. 726/23
(58) Field of Classification Search .............. 726/23
    See application file for complete search history.

(56) References Cited

U.S. PATENT DOCUMENTS

| | | |
|---|---|---|
| 5,251,205 A | 10/1993 | Callon et al. |
| 5,557,742 A | 9/1996 | Smaha et al. |
| 5,717,919 A | 2/1998 | Kodavalla et al. |
| 5,850,516 A | 12/1998 | Schneier |
| 5,956,404 A | 9/1999 | Schneier et al. |
| 5,978,475 A | 11/1999 | Schneier et al. |
| 6,070,244 A | 5/2000 | Orchier et al. |
| 6,134,664 A | 10/2000 | Walker |
| 6,167,520 A | 12/2000 | Touboul |
| 6,192,034 B1 | 2/2001 | Hsieh et al. |
| 6,275,942 B1 | 8/2001 | Bernhard et al. |
| 6,321,338 B1 | 11/2001 | Porras et al. |
| 6,408,391 B1 | 6/2002 | Huff et al. |
| 6,408,404 B1 | 6/2002 | Ladwig |
| 6,484,203 B1 | 11/2002 | Porras et al. |
| 6,542,075 B2 | 4/2003 | Barker et al. |
| 6,587,874 B1 | 7/2003 | Golla et al. |
| 6,694,362 B1 | 2/2004 | Secor et al. |
| 6,704,874 B1 | 3/2004 | Porras et al. |
| 6,708,212 B2 | 3/2004 | Porras et al. |
| 6,711,615 B2 | 3/2004 | Porras et al. |
| 6,839,850 B1 | 1/2005 | Campbell et al. |
| 6,928,556 B2 | 8/2005 | Black et al. |
| 6,966,015 B2 | 11/2005 | Steinberg et al. |
| 6,985,920 B2 | 1/2006 | Bhattacharya et al. |
| 6,988,208 B2 | 1/2006 | Hrabik et al. |
| 7,039,953 B2 | 5/2006 | Black et al. |

(Continued)

FOREIGN PATENT DOCUMENTS

WO  WO 02/45315 A2  6/2002

(Continued)

OTHER PUBLICATIONS

U.S. Appl. No. 60/405,921, filed Aug. 26, 2002, Gisby et al.

(Continued)

*Primary Examiner* — Jacob Lipman

(57) ABSTRACT

The present invention provides for the receipt of a request to modify a software agent's configuration at a server-based manager. A determination of the modifications to the software agent is made at the server-based manager. The requested modifications are then delivered to the software agent. The software agent interprets the requested modifications and implements them.

23 Claims, 12 Drawing Sheets

U.S. PATENT DOCUMENTS

| | | | |
|---|---|---|---|
| 7,043,727 | B2 | 5/2006 | Bennett et al. |
| 7,089,428 | B2 | 8/2006 | Farley et al. |
| 7,127,743 | B1 | 10/2006 | Khanolkar et al. |
| 7,143,444 | B2 | 11/2006 | Porras et al. |
| 7,152,242 | B2 | 12/2006 | Douglas |
| 7,155,514 | B1 | 12/2006 | Milford |
| 7,159,237 | B2 | 1/2007 | Schneier et al. |
| 7,168,093 | B2 | 1/2007 | Hrabik et al. |
| 7,171,689 | B2 | 1/2007 | Beavers |
| 7,219,239 | B1 | 5/2007 | Njemanze et al. |
| 7,260,844 | B1 | 8/2007 | Tidwell et al. |
| 7,278,160 | B2 | 10/2007 | Black et al. |
| 7,308,689 | B2 | 12/2007 | Black et al. |
| 7,318,178 | B2 | 1/2008 | Steinberg et al. |
| 7,333,999 | B1 | 2/2008 | Njemanze |
| 7,340,776 | B2 | 3/2008 | Zobel et al. |
| 7,370,359 | B2 | 5/2008 | Hrabik et al. |
| 7,376,969 | B1 | 5/2008 | Njemanze et al. |
| 7,379,993 | B2 | 5/2008 | Valdes et al. |
| 7,418,733 | B2 | 8/2008 | Connary et al. |
| 7,424,742 | B1 | 9/2008 | Dash et al. |
| 7,437,359 | B2 | 10/2008 | Aguilar-Macias et al. |
| 7,483,972 | B2 | 1/2009 | Bhattacharya et al. |
| 7,506,373 | B2 | 3/2009 | Morin et al. |
| 7,509,677 | B2 | 3/2009 | Saurabh et al. |
| 7,562,388 | B2 | 7/2009 | Hackenberger et al. |
| 7,565,696 | B1 | 7/2009 | Njemanze |
| 7,577,633 | B2 | 8/2009 | Shankar et al. |
| 7,594,260 | B2 | 9/2009 | Porras et al. |
| 7,607,169 | B1 | 10/2009 | Njemanze et al. |
| 7,644,365 | B2 | 1/2010 | Bhattacharya et al. |
| 7,644,438 | B1 | 1/2010 | Dash et al. |
| 7,647,632 | B1 | 1/2010 | Ward et al. |
| 7,650,638 | B1 | 1/2010 | Njemanze et al. |
| 7,788,722 | B1 | 8/2010 | Njemanze et al. |
| 7,797,419 | B2 | 9/2010 | Bhattacharya et al. |
| 2002/0019945 | A1 | 2/2002 | Houston et al. |
| 2002/0147803 | A1 | 10/2002 | Dodd et al. |
| 2003/0084349 | A1 | 5/2003 | Friedrichs et al. |
| 2003/0093692 | A1 | 5/2003 | Porras |
| 2003/0188189 | A1 | 10/2003 | Desai et al. |
| 2003/0221123 | A1 | 11/2003 | Beavers |
| 2004/0024864 | A1 | 2/2004 | Porras et al. |
| 2004/0221191 | A1 | 11/2004 | Porras et al. |
| 2005/0027845 | A1 | 2/2005 | Secor et al. |
| 2006/0212932 | A1 | 9/2006 | Patrick et al. |
| 2007/0136437 | A1 | 6/2007 | Shankar et al. |
| 2007/0150579 | A1 | 6/2007 | Morin et al. |
| 2007/0162973 | A1 | 7/2007 | Schneier et al. |
| 2007/0234426 | A1 | 10/2007 | Khanolkar et al. |
| 2008/0104046 | A1 | 5/2008 | Singla et al. |
| 2008/0104276 | A1 | 5/2008 | Lahoti et al. |
| 2008/0162592 | A1 | 7/2008 | Huang et al. |
| 2008/0165000 | A1 | 7/2008 | Morin et al. |
| 2010/0058165 | A1 | 3/2010 | Bhattacharya et al. |

FOREIGN PATENT DOCUMENTS

| | | |
|---|---|---|
| WO | WO 02/060117 A1 | 8/2002 |
| WO | WO 02/078262 A1 | 10/2002 |
| WO | WO 02/101988 A2 | 12/2002 |
| WO | WO 03/009531 A2 | 1/2003 |
| WO | WO 2004/019186 A2 | 3/2004 |
| WO | WO 2005/001655 | 1/2005 |
| WO | WO 2005/026900 | 3/2005 |

OTHER PUBLICATIONS

ArcSight, "About ArcSight Team," date unknown, [online] [Retrieved on Oct. 25, 2002] Retrieved from the Internet <URL: http://www.arcsight.com/about_team.htm>.

ArcSight, "About Overview," Oct. 14, 2002, [online] [Retrieved on Apr. 21, 2006] Retrieved from the Internet <URL: http://web.archive.org/web/20021014041614/http://www.arcsight.com/about.htm>.

ArcSight, "Contact Info," date unknown, [online] [Retrieved on Oct. 25, 2002] Retrieved from the Internet <URL: http://www.arcsight.com/contact.htm>.

ArcSight, "Enterprise Coverage: Technology Architecture," date unknown, [online] Retrieved from the Internet <URL: http://www.snaiso.com/Documentation/Arcsight/arcsight_archdta.pdf>.

ArcSight, "Managed Process: ArcSight Reporting System," date unknown, [online] Retrieved from the Internet <URL: http://www.snaiso.com/Documentation/Arcsight/arcsigh_reportsys.pdf>.

ArcSight, "Managed Process: Console-Based Management," date unknown, [online] Retrieved from the Internet <URL: http://www.snaiso.com/Documentation/Arcsight/arcsight_console.pdf >.

ArcSight, "Precision Intelligence: SmartAgentTM," date unknown, [online] Retrieved from the Internet <URL: http://www.ossmanagement.com/SmartAgent.pdf>.

ArcSight, "Precision Intelligence: SmartRulesTM and Cross-Correlation," date unknown, [online] Retrieved from the Internet <URL: http://www.snaiso.com/Documentation/Arcsight/arcsight_correlation.pdf>.

ArcSight, "Product Info: 360° Intelligence Yields Precision Risk Management," date unknown, [online] [Retrieved on Oct. 25, 2002] Retrieved from the Internet <URL: http://www.arcsight.com/product_info01.htm>.

ArcSight, "Product Info: ArcSight Console," date unknown, [online] [Retrieved on Nov. 15, 2002] Retrieved from the Internet <URL: http:www.arcsight.com/product_info05.htm>.

ArcSight, "Product Info: ArcSight Cross-Device Correlation," date unknown, [online] [Retrieved on Oct. 25, 2005] Retrieved from the Internet <URL: http://www.arcsight.com/product_info03.htm>.

ArcSight, "Product Info: ArcSight Manager," date unknown, [online] [Retrieved on Oct. 25, 2002] Retrieved from the Internet <URL: http://www.arcsight.com/product_info04.htm>.

ArcSight, "Product Info: ArcSight Reporting System," date unknown, [online] [Retrieved on Oct. 25, 2002] Retrieved from the Internet <URL: http:www.arcsight.com/product_info06.htm>.

ArcSight, "Product Info: ArcSight SmartAgents," Oct. 10, 2002, [online] [Retrieved on Apr. 21, 2006] Retrieved from the Internet <URL:http://web.archive.org/web/20021010135236/http://www.arcsight.com/product_info02.htm>.

ArcSight, "Product Info: Enterprise Scaling," date unknown, [online] [Retrieved on Oct. 25, 2002] Retrieved from the Internet <URL: http://www.arcsight.com/product_info07.htm>.

ArcSight, "Product Info: Product Overview and Architecture," date unknown, [online] [Retrieved on Oct. 25, 2002] Retrieved from the Internet <URL: http://www.arcsight.com/product.htm>.

ArcSight, "Security Management for the Enterprise," 2002, [online] [Retrieved on Oct. 25, 2002] Retrieved from the Internet <URL: http:www.arcsight.com/>.

ArcSight, "Technical Brief: How Correlation Eliminates False Positives," date unknown, source unknown.

Bruneau, G., "What Difficulties are Associated on Matching Events with Attacks. Why is Event/Data Correlation Important?," 2001, [online] [Retrieved on Nov. 1, 2002] Retrieved from the Internet <URL: http://www.sans.org/newlook/resources/IDFAQ/matching.htm>.

Burleson, D., "Taking Advantage of Object Partitioning in Oracle8i," Nov. 8, 2000, [online] [Retrieved on Apr. 20, 2004] Retrieved from the Internet <URL: http://www.dba-oracle.com/art_partit.htm>.

CERT Coordination Center, "Overview of Attack Trends," 2002, [online] Retrieved from the Internet <URL: http://www.cert.org/archive/pdf/attack_trends.pdf>.

Cheung, S. et al., "EMERALD Intrusion Incident Report: 601 Message Specification," Aug. 10, 2000, System Design Laboratory, SRI International.

Derodeff, C. "Got Correlation? Not Without Normalization," 2002, [online] Retrieved from the Internet <URL: http://www.svic.com/papers/pdf/Got-Correlation_rmalization.pdf>.

Haley Enterprise, "A Rules Engine for Java Based on the Rete Algorithm," 2002, [online] [Retrieved on Oct. 29, 2002] Retrieved from the Internet <URL: http://www.haley.com/0072567836705810/ReteAlgorithmForRules.html>.

Haley Enterprise, "Production Systems," 2002, [online] [Retrieved on Oct. 29, 2002] Retrieved from the Internet <URL: http://www.haley.com/0072567836705810/ProductionSystems.html>.

Haley Enterprise, "The Rete Algorithm," 2002, [online] [Retrieved on Oct. 29, 2002] Retrieved from the Internet <URL: http://www.haley.com/0072567836705810/ReteAlgorithm.html>.

Halme, L.R. et al., "AINT Misbehaving: A Taxonomy of Anti-Intrusion Techniques," 2000, [online] [Retrieved on Nov. 1, 2002] Retrieved from the Internet <URL: http://www.sans.org/newlook/resources/IDFAQ/aint.htm>.

Heberlein, L. T., et al., "A Method to Detect Intrusive Activity in a Networked Environment," Proceedings of the Fourteenth National Computer Security Conference, NIST/NCSC, Oct. 1-4, 1991, Washington, D.C., pp. 362-371.

Ingargiola, G., "The Rete Algorithm," date unknown, [online] [Retrieved on Oct. 29, 2002] Retrieved from the Internet <URL: http://yoda.cis.temple.edu:8080/UGAIWWW/lectures/rete.html>.

Javitz, H. S., et al., "The NIDES Statistical Component Description and Justification," SRI Project 3131, Contract N00039-92-C-0015, Annual Report, A010, Mar. 7, 1994.

Jou, Y. F., et al., "Architecture Design of a Scalable Intrusion Detection System for the Emerging Network Infrastructure," MCNC, Technical Report CDRL A005, Apr. 1997.

Lindqvist, U. et al., "Detecting Computer and Network Misuse Through the Production-Based Expert System Toolset (P-BEST)," Proceedings of the IEEE Symposium on Security and Privacy, Oakland, California, May 9-12, 1999.

National Institute of Standards and Technology (NIST), "Federal Information Processing Standards Publication (FIPS PUB) 199: Standards for Security Categorization of Federal Information and Information Systems", Feb. 2004.

National Institutes of Health (NIH), "Table 1: Security Categorization of Federal Information and Information Systems," revised Jul. 8, 2005, [online] [retrieved on Apr. 6, 2006] Retrieved from the Internet <URL: http://irm.cit.nih.gov/security/table1.htm>.

Porras, P. A., et al., "Live Traffic Analysis of TCP/IP Gateways," Symposium on Networks and Distributed Systems Security, Internet Society, Mar. 1998.

Porras, P.A. et al., "A Mission-Impact-Based Approach to INFOSEC Alarm Correlation," Oct. 2002, Lecture Notes in Computer Science, Proceedings: Recent Advances in Intrusion Detection, pp. 95-114, Zurich, Switzerland.

Porras, P.A. et al., "EMERALD: Event Monitoring Enabling Responses to Anomalous Live Disturbances," Oct. 1997, Proceedings of the 20th NIST-NCSC National Information Systems Security (NISS) Conference.

Robinson, S. L., "Memorandum Opinion" in *SRI International, Inc.* v. *Internet Security Systems, Inc.* and *Symantec Corporation* (D. Del., Civ. No. 04-1199-SLR), Oct. 17, 2006.

U.S. Appl. No. 10/308,416, filed Dec. 2, 2002.
U.S. Appl. No. 10/308,584, filed Dec. 2, 2002.
U.S. Appl. No. 10/308,767, filed Dec. 2, 2002.
U.S. Appl. No. 10/308,941, filed Dec. 2, 2002.
U.S. Appl. No. 10/683,191, filed Oct. 10, 2003.
U.S. Appl. No. 10/683,221, filed Oct. 10, 2003.
U.S. Appl. No. 10/713,471, filed Nov. 14, 2003.
U.S. Appl. No. 10/821,459, filed Apr. 9, 2004.
U.S. Appl. No. 10/839,563, filed May 4, 2004.
U.S. Appl. No. 10/974,105, filed Oct. 27, 2004.
U.S. Appl. No. 11/021,601, filed Dec. 23, 2004.
U.S. Appl. No. 11/023,942, filed Dec. 27, 2004, pp. 1-26.
U.S. Appl. No. 11/070,024, filed Mar. 1, 2005.
U.S. Appl. No. 11/740,203, filed Apr. 25, 2007.
U.S. Appl. No. 11/836,251, filed Aug. 9, 2007.
U.S. Appl. No. 12/098,322, filed Apr. 4, 2008.

Valdes, A., et al., "Statistical Methods for Computer Usage Anomaly Detection Using NIDES (Next-Generation Intrusion Detection Expert System)," Proceedings of the Third International Workship on Rough Sets and Soft Computing (RSSC 94), Jan. 27, 1995, San Jose, CA, pp. 306-311.

Wood, M., et al., "Internet-Draft: Intrusion Detection Message Exchange Requirements," Jun. 23, 2002, [online] [Retrieved on Nov. 1, 2002] Retrieved from the Internet <URL: http://www.silicondefense.com/idwg/draft-ietf-idwg-requirements-07.txt>.

MODULAR AGENT FOR NETWORK SECURITY INTRUSION DETECTION SYSTEM

CROSS-REFERENCE TO RELATED APPLICATION

This application claims the benefit under 35 U.S.C. §120 as a continuation of patent application Ser. No. 10/308,548, filed on Dec. 2, 2002 entitled "Modular Agent for Network Security Intrusion Detection System", which is incorporated by reference herein in its entirety.

FIELD OF THE INVENTION

The present invention relates to a computer-based system for capturing security events from heterogeneous sources, normalizing such events to a common schema and cross-correlating such normalized events with rules to create meta-events.

BACKGROUND

Computer networks and systems have become indispensable tools for modern business. Today terabits of information on virtually every subject imaginable are stored in and accessed across such networks by users throughout the world. Much of this information is, to some degree, confidential and its protection is required. Not surprisingly then, intrusion detection systems (IDS) have been developed to help uncover attempts by unauthorized persons and/or devices to gain access to computer networks and the information stored therein.

Intrusion detection may be regarded as the art of detecting inappropriate, incorrect or anomalous activity within or concerning a computer network or system. The most common approaches to intrusion detection are statistical anomaly detection and pattern-matching detection. IDS that operate on a host to detect malicious activity on that host are called host-based IDS (and may exist in the form of host wrappers/personal firewalls or agent-based software), and those that operate on network data flows are called network-based IDS. Host-based intrusion detection involves loading software on the system (the host) to be monitored and using log files and/or the host's auditing agents as sources of data. In contrast, a network-based intrusion detection system monitors the traffic on its network segment and uses that traffic as a data source. Packets captured by the network interface cards are considered to be of interest if they match a signature.

Regardless of the data source, there are two complementary approaches to detecting intrusions: knowledge-based approaches and behavior-based approaches. Almost all IDS tools in use today are knowledge-based. Knowledge-based intrusion detection techniques involve comparing the captured data to information regarding known techniques to exploit vulnerabilities. When a match is detected, an alarm is triggered. Behavior-based intrusion detection techniques, on the other hand, attempt to spot intrusions by observing deviations from normal or expected behaviors of the system or the users (models of which are extracted from reference information collected by various means). When a suspected deviation is observed, an alarm is generated.

Advantages of the knowledge-based approaches are that they have the potential for very low false alarm rates, and the contextual analysis proposed by the intrusion detection system is detailed, making it easier for a security officer using such an intrusion detection system to take preventive or corrective action. Drawbacks include the difficulty in gathering the required information on the known attacks and keeping it up to date with new vulnerabilities and environments.

Advantages of behavior-based approaches are that they can detect attempts to exploit new and unforeseen vulnerabilities. They are also less dependent on system specifics. However, the high false alarm rate is generally cited as a significant drawback of these techniques and because behaviors can change over time, the incidence of such false alarms can increase.

Regardless of whether a host-based or a network-based implementation is adopted and whether that implementation is knowledge-based or behavior-based, an intrusion detection system is only as useful as its ability to discriminate between normal system usage and true intrusions (accompanied by appropriate alerts). If intrusions can be detected and the appropriate personnel notified in a prompt fashion, measures can be taken to avoid compromises to the protected system. Otherwise such safeguarding cannot be provided. Accordingly, what is needed is a system that can provide accurate and timely intrusion detection and alert generation so as to effectively combat attempts to compromise a computer network or system.

SUMMARY OF THE INVENTION

In one embodiment, the invention is a method. The method includes receiving a request to modify a software agent's configuration. The method also includes determining the modifications to be made to the software agent's configuration. Moreover, the method includes delivering the modifications to the software agent.

In an alternate embodiment, the invention is also a method. The method includes receiving security event information at a server-based manager from a software agent. The method also includes comparing the security event information against a predetermined set of rules. The method further includes generating a set of instructions based on the comparison of the security event information to the predetermined set of rules. Furthermore, the method includes transmitting the set of instructions to the software agent.

In another alternate embodiment, the invention is a system. The system includes a number of network components configured to provide security event information in a component-specific format. The system also includes a number of software agents included within a host machine, each associated with one or more of the network components, and configured to normalize security event information from the associated network components into a common security event information schema. The system further includes a server-based manager configured to receive normalized security event information reports from the agents and to cross-correlate security event information reports from different ones of the agents according to one or more rules to produce meta-events.

BRIEF DESCRIPTION OF THE DRAWINGS

The present invention is illustrated by way of example, and not limitation, in the figures of the accompanying drawings in which.

DETAILED DESCRIPTION

Figure 1:
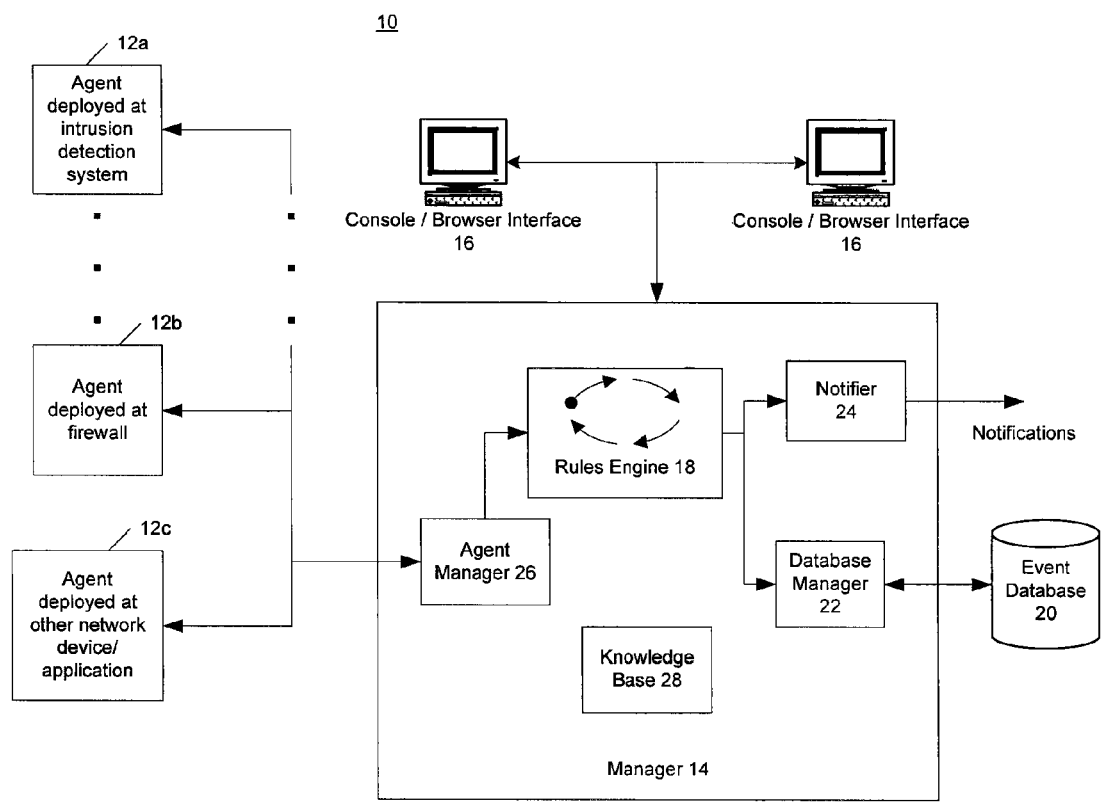
FIG. 1 illustrates one embodiment of a computer-based system for capturing, normalizing and reporting security events from heterogeneous sources configured in accordance with the present invention.

Described herein is a computer-based system for capturing security events from heterogeneous sources, normalizing such events to a common schema and cross-correlating such normalized events with rules to create meta-events. The system (one embodiment of which is manifest as computer software) enables aggregation, correlation, detection, and investigative tracking of suspicious network activities from multiple security devices. The present system also supports response management, ad-hoc query resolution, reporting and replay for forensics analysis, and graphical visualization of network threats and activity.

Although the present system will be discussed with reference to various illustrated examples, these examples should not be read to limit the broader spirit and scope of the present invention. For example, the examples presented herein describe distributed agents, managers and consoles, which are but one embodiment of the present invention. The general concepts and reach of the present invention are much broader and may extend to any computer-based or network-based security system. Also, examples of the messages that may be passed to and from the components of the system and the data schemas that may be used by components of the system are given in an attempt to further describe the present invention, but are not meant to be all-inclusive examples and should not be regarded as such.

Some portions of the detailed description that follows are presented in terms of algorithms and symbolic representations of operations on data within a computer memory. These algorithmic descriptions and representations are the means used by those skilled in the computer science arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

As indicated above, one embodiment of the present invention is instantiated in computer software, that is, computer readable instructions, which, when executed by one or more computer processors/systems, instruct the processors/systems to perform the designated actions. Such computer software may be resident in one or more computer readable media, such as hard drives, CD-ROMs, DVD-ROMs, read-only memory, read-write memory and so on. Such software may be distributed on one or more of these media, or may be made available for download across one or more computer networks (e.g., the Internet). Regardless of the format, the computer programming, rendering and processing techniques discussed herein are simply examples of the types of programming, rendering and processing techniques that may be used to implement aspects of the present invention. These examples should in no way limit the present invention, which is best understood with reference to the claims that follow this description.

Referring now to FIG. 1, an example of a computer-based system 10 architected in accordance with an embodiment of the present invention is illustrated. System 10 includes agents 12, one or more managers 14 and one or more consoles 16 (which may include browser-based versions thereof). In some embodiments, agents, managers and/or consoles may be combined in a single platform or distributed in two, three or more platforms (such as in the illustrated example). The use of this multi-tier architecture supports scalability as a computer network or system grows.

Agents 12 are software programs that provide efficient, real-time (or near real-time) local event data capture and filtering from a variety of network security devices and/or applications. The primary sources of security events are common network elements including firewalls, intrusion detection systems and operating system logs. Agents 12 can collect events from any source that produces event logs or messages and can operate at the native device, at consolidation points within the network, and/or through simple network management protocol (SNMP) traps.

Managers 14 are server-based components that further consolidate, filter and cross-correlate events received from the agents, employing a rules engine 18 and a centralized event database 20. One role of manager 14 is to capture and store all of the real-time and historic event data to construct (via database manager 22) a complete, enterprise-wide picture of security activity. The manager 14 also provides centralized administration, notification (through one or more notifiers 24), and reporting, as well as a knowledge base 28 and case management workflow. The manager 14 may be deployed on any computer hardware platform and one embodiment utilizes an Oracle™ database. Communications between manager 14 and agents 12 may be bi-directional (e.g., to allow manager 14 to transmit commands to the platforms hosting agents 12) and encrypted. In some installations, managers 14 may act as concentrators for multiple agents 12 and can forward information to other managers (e.g., deployed at a corporate headquarters).

Consoles 16 are computer- (e.g., workstation-) based applications that allow security professionals to perform day-to-day administrative and operation tasks such as event monitoring, rules authoring, incident investigation and reporting. Access control lists allow multiple security professionals to use the same system and event database, with each having their own views, correlation rules, alerts, reports and knowledge base appropriate to their responsibilities. A single manager 14 can support multiple consoles 16.

In some embodiments, a browser-based version of the console 16 may be used to provide access to security events, knowledge base articles, reports, notifications and cases. That is, the manager 14 may include a web server component accessible via a web browser hosted on a personal computer (which takes the place of console 16) to provide some or all of the functionality of a console 16. Browser access is particularly useful for security professionals that are away from the consoles 16 and for part-time users. Communication between consoles 16 and manager 14 is bi-directional and may be encrypted.

Through the above-described architecture the present invention can support a centralized or decentralized environment. This is useful because an organization may want to implement a single instance of system 10 and use an access control list to partition users. Alternatively, the organization may choose to deploy separate systems 10 for each of a number of groups and consolidate the results at a "master" level. Such a deployment can also achieve a "follow-the-sun" arrangement where geographically dispersed peer groups collaborate with each other by passing primary oversight responsibility to the group currently working standard business hours. Systems 10 can also be deployed in a corporate hierarchy where business divisions work separately and support a rollup to a centralized management function.

Examining each of the various components in further detail, we begin with the agents 12. Agents 12 are used to collect, reduce and normalize the enormous amount of data that is generated by a network's security devices before a manager 14 acts on the data. As will become evident, this process goes beyond simple log consolidation. Before presenting those details, however, and to understand why such measures are desirable, some background regarding how analysts currently cope with security event information generated by multiple network devices is useful.

Conventional intrusion detection systems can help an analyst detect an attack directed at a network resource such as a server. Usually, such investigations are launched in response to an alert generated by the IDS. As a first step after receiving such an alert, an analyst might review perimeter router logs to see if a router associated with the network passed a packet that triggered the alert. If such a packet were discovered, the analyst would likely then want to review one or more firewall logs to see if any existing filters blocked the suspect packet. Assume, for the sake of this example, the suspect packet got past any firewalls; further investigation would be necessary to determine whether the integrity of the server itself was compromised. Such an integrity check may be performed using a conventional software application such as Tripwire, which is a file integrity checker employing MD5 checksums, to see which files, if any, had been accessed or modified. Finally, the analyst may have to examine a Syslog or an EventLog from the subject server, as well as any tcpdump data collected by a dedicated tcpdump host, for the segment of time surrounding the attack to determine what actually happened.

By this time the analyst has accessed many different systems and looked at several different types of logs in an effort to distill a comprehensive view of the attack. This can be a significant amount of work, and time taken in such review and analysis is time lost from the vitally important tasks of securing the network and restoring the compromised server to make sure that no other systems will be affected. The present invention helps to minimize the time spent on such analysis by consolidating all the relevant information in a single logging facility, allowing the analyst to look at the data in whatever sequence or depth he or she requires.

More than just consolidation, though, the present agents 12 provide data normalization, which is of great benefit when an analyst must deal with security incidents in a heterogeneous network environment. To understand why normalization is helpful consider a typical enterprise environment, which consists of many different types of network devices ranging from border routers and VPN devices, to firewalls and authentication servers, and a wide range of application servers such as web servers, e-mail servers and database servers. Each of these devices generates logs that, as described above, are sources of data to a security analyst. However, it is seldom, if ever, the case that two manufactures will use the same event logging mechanism or format their event logs identically. For example a Cisco Systems PIX™ firewall will not report an accepted packet in the same way as a Check Point firewall or even in the same fashion as a Cisco Systems router.

An example of the types of various reports that might be generated by different network devices is presented below in Table 1, which shows examples of logs from different network devices, each reporting the same packet travelling across a network. In particular, these logs represent a remote printer buffer overflow that connects to IIS servers over port 80.

TABLE 1

Examples of Event Logs for Different Network Devices.

| Network Device | Event Log |
|---|---|
| Check Point firewall | "14" "21Dec2001" "12:10:29" "eth-s1p4c0" "ip.of.firewall" "log" "accept" "www-http" "65.65.65.65" "10.10.10.10" "tcp" "4" "1355" " " " " " " " " " " " " " " " firewall" " len 68" |
| Cisco Systems router | Dec 21 12:10:27: %SEC-6-IPACCESSLOGP: list 102 permitted tcp 65.65.65.65(1355) −> 10.10.10.10(80), 1 packet |
| Cisco Systems PIX firewall | Dec 21 2001 12:10:28: %PIX-6-302001: Built inbound TCP connection 125891 for faddr 65.65.65.65/1355 gaddr 10.10.10.10/80 laddr 10.0.111.22/80 |
| Snort | [] [1:971:1] WEB-IIS ISAPI .printer access [] [Classification: Attempted Information Leak] [Priority: 3] 12/21-12:10:29.100000 65.65.65.65:1355 −> 10.10.10.10:80 TCP TTL:63 TOS:0x0 ID:5752 IpLen:20 DgmLen:1234 DF *AP* Seq: 0xB13810DC Ack: 0xC5D2E066 Win: 0x7D78 TcpLen: 32 TCP Options (3) => NOP NOP TS: 493412860 0 [Xref => http://cve.mitre.org/cgi-bin/cvename.cgi?name=CAN-2001-0241] [Xref => http://www.whitehats.com/info/IDS533] |

The Check Point record contains the following fields: event id, date, time, firewall interface, IP address of the firewall interface, logging facility, action, service, source IP, target IP, protocol, source port, some Check Point specific fields and then the size of the datagram. This report is, to say the least, difficult for a human analyst to read (especially with all the empty fields that are represented by double quotes). The Cisco router has a different format: date, time, logging facility, event name, source IP, source port, target address, target port, and number of packets. The Cisco PIX firewall, which is produced by the same manufacturer as the router, uses yet another format: date, time, event name, source IP, source port, translated address or target address, target port, local address, and local port.

The final record is a Snort alert that claims this traffic was malicious. Snort is a well-known IDS and the fields it populates are: exploit or event name, classification, priority, date, time, source IP, source port, target IP, target port, protocol, TTL (time to live), type of service, ID, IP length, datagram length, tcp flags, sequence number, acknowledgement number, window size, and tcp length. Snort also reports additional data such as references to investigate the exploit.

Agents 12 may be deployed in connection with some or all of these (and other) network components and applications. For example, in FIG. 1, agent 12a is deployed in connection with an IDS (such as Snort). Agent 12b is deployed in connection with a firewall (such as the Check Point firewall and/or the Cisco PIX firewall). Agent 12c is deployed in connection with other network components or agents (e.g., a router). Each of these agents receives the event information from its associated network device or application in that device's or application's native format and converts (or normalizes) the information to a common schema. This normalization allows for later storage of the event information in a format that can more readily be utilized by an analyst.

Many normalized schemas can be used and, in general, choosing the fields of a common schema may be based on content rather than semantic differences between device logs and/or manufacturers. To accomplish this normalization, agents 12 are equipped with a parser configured to extract values from the events as reported by the individual network devices/applications and populate the corresponding fields in the normalized schema. Table 2 is an example of a normalized schema for the data reported by the devices in Table 1.

Table 2 reports the same four events described earlier, this time in a normalized fashion. Each of the agents 12 is configured to extract the relevant data from events reported by its associated network device/application and map that data to the corresponding common schema representation. For instance the Check Point firewall reports a target port as www-http, not as port 80 as is the case for most other network devices. Therefore an agent 12 associated with the Check Point firewall is configured with an appropriate lookup mechanism (e.g., a table) to ensure that "www-http" as reported by the firewall gets translated into "port 80" when the agent 12 reports the event to the manager 14.

Similarly, the agents 12 may need to be configured to convert the date/time stamp formats used by the various network devices/applications into a common date/time representation. That is, because the different network devices/applications all use different date/time formats, the agents cannot simply report the date/time stamps reported by the device/application. Instead, the agents 12 may be configured to convert local date/time stamps to a universal date/time notation, such as Greenwich Mean Time.

In addition to normalizing event data by fields, agents 12 can parse the event data stream and set field values based on conventions and practices of the organization. For example, the variety of event severity levels that devices produce can all be normalized at the agent level into a single, consistent hierarchy.

Thus, agents 12 collect and process events generated by heterogeneous network devices/applications throughout an enterprise. Alerts can come from routers, e-mail logs, antivirus products, firewalls, intrusion detection systems, access control servers, VPN systems, NT Event Logs, Syslogs, and other sources where security threat information is detected and reported. In some embodiments, each event generator has an agent 12 assigned to collect all relevant security information, while in other embodiments agents are shared among two or more event generators. Thus, depending on the device/application to be monitored and the in-place infrastructure, a choice is provided for simple log parsing and loading, network listening (e.g., through SNMP traps), installation on aggregation points (Syslog servers and concentrators) and full distribution to all security-relevant devices.

TABLE 2

Common Schema Representation of Event Data

| Date | Time | Event Name | Src_IP | Src_Port | Tgt_IP | Trg_Port | Device Type | Additional data |
| --- | --- | --- | --- | --- | --- | --- | --- | --- |
| 21 Dec. 2001 | 12:10:29 | accept | 65.65.65.65 | 1355 | 10.10.10.10 | 80 | Check Point | |
| 21 Dec. 2001 | 12:10:27 | list 102 permitted tcp | 65.65.65.65 | 1355 | 10.10.10.10 | 80 | Cisco Router | |
| 21 Dec. 2001 | 12:10:28 | built inbound tcp connection | 65.65.65.65 | 1355 | 10.10.10.10 | 80 | Cisco PIX | |
| 21 Dec. 2001 | 12:10:29 | WEB-IIS ISAPI.printer access | 65.65.65.65 | 1355 | 10.10.10.10 | 80 | Snort | TCP TTL: 63 TOS: 0x0 ID: 5752 IpLen: 20 DgmLen: 1234 DF *AP* Seq: 0xB13810DC Ack: 0xC5D2E066 Win: 0x7D78 TcpLen: 32 TCP Options (3) = > NOP NOP TS: 493412860 0 |

In addition to collecting and normalizing data from security devices, the agents 12 intelligently manage the data with:

Filtering: each agent 12 can be configured according to conditions by which data will be collected and sent to the manager 14. This helps to reduce the need to collect and manage large volumes of unwanted data.

Aggregation: Based on the time period selected, the agents 12 can collect duplicate alerts but send only a single message with a count of the total number of such alerts to the manager 14. This helps reduce the amount of traffic transmitted across the network.

Batching: Agents 12 can be configured to send a collection of alerts at one time rather than sending alerts immediately after each occurrence.

Figures 2, 3:
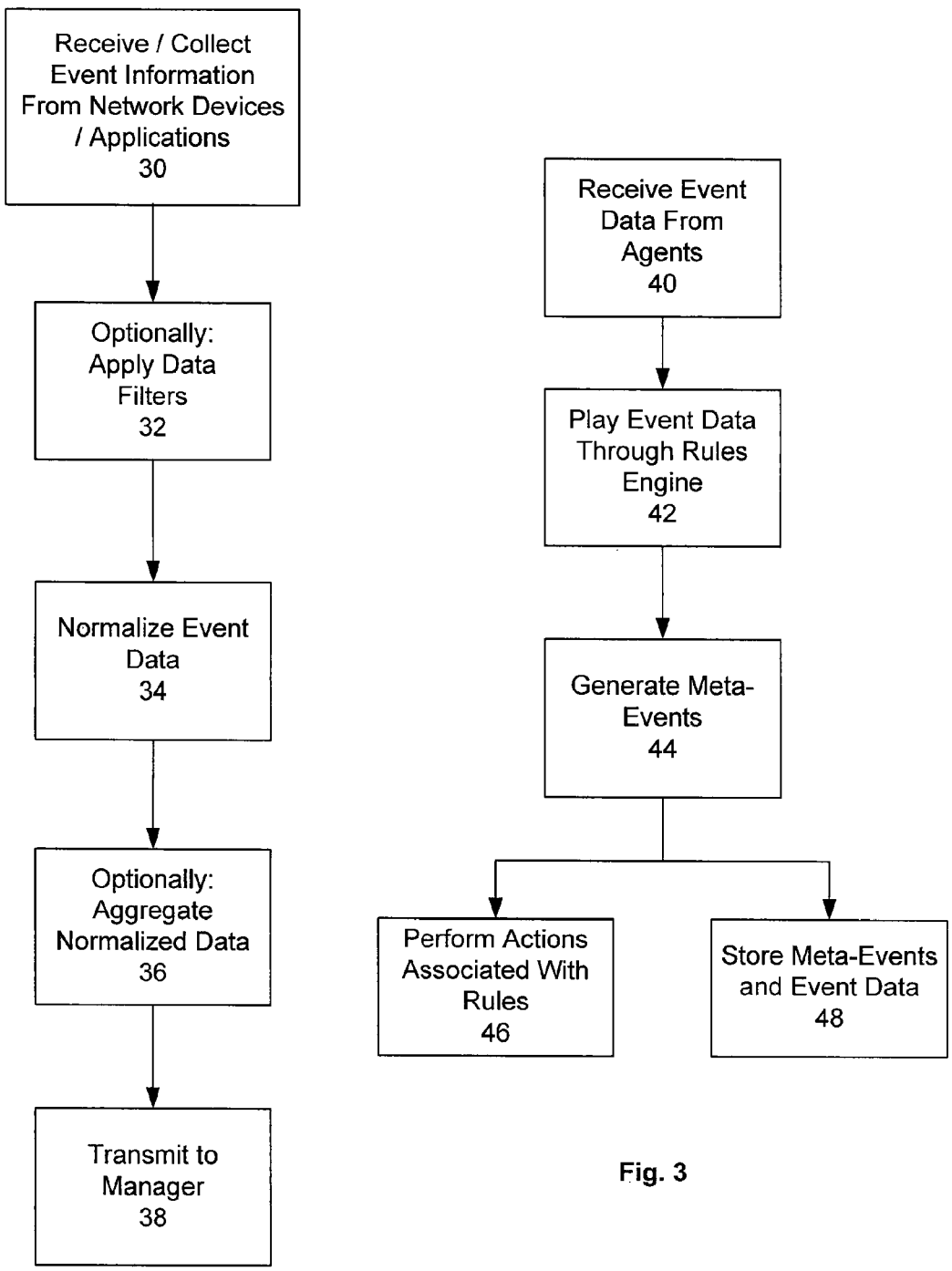
FIG. 2 illustrates procedures followed by an agent configured in accordance with an embodiment of the present invention when collecting, normalizing and reporting security event data.
FIG. 3 illustrates procedures followed by a manager configured in accordance with an embodiment of the present invention when analyzing security event data and generating alerts based thereon.

FIG. 2 illustrates the various processes performed by agents 12 from the point of view of the event information. Initially, at step 30, the raw event information is received or collected from the native network device or application in that device's/application's native format. At this point (or, optionally, following normalization), data filters may be applied to reduce the volume of data being passed for further analysis (step 32). Such filtering is optional and may involve assessing the captured data against one or more conditions to determine whether or not the data is relevant for further analysis.

Thereafter, the event data is normalized at step 34. As indicated above, the normalization may occur at the field and/or the field value level. Further, the normalization may involve translation of the field values into nomenclatures/formats used across an enterprise.

Following normalization, the event data may, optionally, be aggregated (step 36) before being transmitted to the manager 14 (step 38). The transmissions may occur as the events are captured or may be made on a batched basis. In either case, the messages used to transmit the event data preferably include all of the source fields of an event. By delivering the entire event data set (i.e., all of the source fields) organized in a consistent format (i.e., the common schema), powerful upstream data management, cross-correlation, display and reporting is available to the security team. In some embodiments the event data is discarded after successful transmission to the manager 14, but in other cases the data may be cached for a time at the agent 12 to permit later replay of the data.

Referring again to FIG. 1, the manager 14 includes one or more agent managers 26, which are responsible for receiving the event data messages transmitted by the agents 12. Where bi-directional communication with the agents 12 is implemented, these agent managers 26 may be used to transmit messages to the agents 12. If encryption is employed for agent—manager communications (which is optional), the agent manager 26 is responsible for decrypting the messages received from agents 12 and encrypting any messages transmitted to the agents 12.

Once the event data messages have been received (and if necessary decrypted), the event data is passed to the rules engine 18. Rules engine 18 is at the heart of the manager 14 and is used to cross-correlate the event data with security rules in order to generate meta-events. Meta-events, in the context of the present invention, are instances of (usually) multiple individual event data elements (gathered from heterogeneous sources) that collectively satisfy one or more rule conditions such that an action is triggered. Stated differently, the meta-events represent information gathered from different sensors and presented as correlated results (i.e., the decision output of the rules engine 18 indicating that different events from different sources are associated with a common incident as defined by one or more rules).

The actions triggered by the rules may include notifications transmitted (e.g., via notifier 24) to designated destinations (e.g., security analysts may be notified via the consoles 16, e-mail messages, a call to a telephone, cellular telephone, voicemail box and/or pager number or address, or by way of a message to another communication device and/or address such as a facsimile machine, etc.) and/or instructions to network devices (e.g., via agents 12 or via external scripts or programs to which the notifier 24 may pass arguments) to take action to thwart a suspected attack (e.g., by reconfiguring one or more of the network devices, and or modifying or updating access lists, etc.). The information sent with the notification can be configured to include the most relevant data based on the event that occurred and the requirements of the analyst. In some embodiments, unacknowledged notifications will result in automatic retransmission of the notification to another designated operator.

As discussed below, when meta-events are generated by the rules engine 18, on-screen notifications may be provided to consoles 16 to prompt users to open cases for investigation of the events which led to the notification. This may include accessing knowledge base 28 to gather information regarding similar attack profiles and/or to take action in accordance with specified procedures. The knowledge base 28 contains reference documents (e.g., in the form of web pages and/or downloadable documents) that provide a description of the threat, recommended solutions, reference information, company procedures and/or links to additional resources. Indeed, any information can be provided through the knowledge base 28. By way of example, these pages/documents can have as their source: user-authored articles, third-party articles, and/or security vendors' reference material.

The rules engine 18 is based on a RETE engine configured to preserve event information state over configurable time windows so as to provide correlation of the event data according to specified rules. Correlation is generally regarded as a process of bringing information items into mutual relation. In the context of the present invention, correlation through rules engine 18 provides the ability to access, analyze, and relate different attributes of events from multiple sources to bring something to the attention of an analyst that might (or likely would) have otherwise gone unnoticed. In other words, the rules engine 18 provides the ability to determine what type of incident is represented by a collection of events reported by a number of heterogeneous network devices and/or applications. Because the collected event data is normalized into a common event schema, correlation can be performed utilizing any field including, but not limited to, geography, device type, source, target, time thresholds, and/or event type. Based on alerts generated by the rules engine 18, operators are provided with a workflow for investigating these incidents.

Turning to FIG. 3, the manager 14 receives (step 40) and analyzes (step 42) the event data reported by agents 12 in real-time (or near real-time owing to network latencies and depending upon whether or not batched message transmission is used) according to a set of flexible rules. The rules define which events generate an alert, when those events generate an alert, and what actions are associated with the alert. Hence, the rules may be written to contain event conditions, thresholds, and actions. In some embodiments the rule conditions may be specified using Boolean operators and/or database queries. When incoming events match a particular rule's conditions and thresholds, causing a meta-event to be generated (step 44), the rule automatically fires the action that has been defined (step 46). Such actions can include, but are not limited to: executing a pre-determined command or script, logging the alert, sending the alert to the consoles 16, sending the alert to notification designees, setting custom severity levels for the alert based on cumulative activity, adding a source to a suspicious list or a target to a vulnerable list, and/or a combination of these actions.

Rules may be created at the manager 14 and/or at the consoles 16 using a flexible scripting language. An example of a rule might be:

If (an ids evasion attack) occurs (from the same source ip address) (3 times) within (2 minutes) then (send message to console) and (notify the security supervisor via pager).

In this example, the incoming event data would be compared against the rule conditions and thresholds (in the above example 3 events that satisfy the condition of an IDS evasion attack are required and all must originate from a common source IP address and be detected within 2 minutes of each other), and if those criteria are satisfied the designated actions (here, sending an alert message to the consoles 16 and also notifying a security supervisor via a pager) would be performed. The correlation rules that operate on the events evaluate threats and attacks according to selected criteria (e.g., degree of threat, level of success, vulnerability of target and value of target) and generate alerts according to a security intelligence taxonomy that focuses attention on the most dangerous and potentially most damaging attacks. For example, threats to network assets that are deemed not to have succeeded or that are not likely to succeed may be coded green, while those that have succeeded or have a high probability of success might be coded red. The value of the security information taxonomy lies in its ability to eliminate false positives while clearly identifying real threats to vulnerable and valuable assets.

In general, the rules may be designed to capture threats and attacks that are typical in large, diverse networks and may be organized to provide multiple lines of defense by detecting specific activities and grouping them according to level of threat:

Reconnaissance zone transfer, port scan, protocol, scanning, etc.

Suspicious illegal outgoing traffic, unusual levels of alerts from the same host, etc.

Attack overflow, IDS evasion, virus, denial of service, etc.

Successful compromise of a backdoor, root compromise, covert channel exploit, etc.

Similar events and signatures may be grouped into rule categories that can be utilized by the rules to insulate the rule from changes in vendor-specific event details. For example, event names may change between product releases or new devices may be added to the network infrastructure with a new set of nomenclature. Since the rule categories map similar signatures into a single name that is used by the rules engine, if an individual network device changes taxonomy, only the mapping is changed, not the rule definition. Therefore, despite changes in individual devices, the investment in custom defined rules is preserved.

After the events are processed by rules engine 18, the raw event data as well as any meta-events that were generated are stored in database 20 (step 48). In some embodiments, the raw event data may be stored prior to or concurrently with processing of the data by rules engine 18. Regardless of the sequence, such storage of the event data (and the meta events generated by the rules engine 18) preserves a historical record of the event traffic and allows for replaying of the events through an existing or a new rule set (either at the manager 14 or the consoles 16) in order to assess the efficacy of new rules, for training purposes, and/or for case investigation.

Correlation via the rules ensures that credible threats and attacks come to the attention of the security staff on a high-priority basis. Hence once an alert is received, the operator can perform in-depth analysis and take aggressive action secure in the knowledge that the effort is well spent. When a rule match is reported to a console 16, the analyst can quickly drill down (through an associated graphical user interface) to see all of the individual events that caused the rule to fire. If necessary, the analyst can investigate even further to see all of the individual data elements captured for those events.

When action is required, the present invention provides a full set of tools and services for the operator. Resources such as the rule definition, a knowledge base article containing company policies and recommended actions, and the development of a complete case docket describing the problem assist the operator in responding immediately to critical security threats. If necessary, the operator can proactively deal with an attack by launching specific applications or scripts from the console 16 to reconfigure device settings or change access privileges.

The console 16 provides a centralized view into the security status of an enterprise and gives administrators, analysts, and operators an interface to perform security management tasks. In various embodiments; the console provides event display in real-time or in replay mode (i.e., the ability to playback events from a given time period according to a VCR or DVD metaphor). Replay may be had from the events stored in database 20 or, in some instances, from caches associated with agents 12. This latter form of replay is especially useful because it provides improved simulation of actual network conditions as the events are played out across the same network as during the original attack.

Consoles 16 also provide operators with complete drill-down capability from the highest level of detail (e.g., the entire range of events) to the lowest level of detail (e.g., fields within a single event). This allows analysts to probe at whatever level of detail is required to gain further insight into an attack and assess vulnerability. This varying level of detailed analysis is made possible because the agents 12 report all of the event data fields, not merely a subset thereof. By way of example, one tool provides analysts with the ability to quickly see similar characteristics of events using a cursor control operation, such as a mouse click. For example, if analysts are presented with a meta-event alert that consists of, say, twenty or more individual events reported by several different agents associated with different network devices, the present user interface associated with consoles 16 allows the analyst to quickly visualize only the common fields of these events (e.g., such as a source IP address) by simply highlighting the events and performing a mouse click/select operation.

Once security personnel have been notified of a meta-event, they can utilize the knowledge base to determine the appropriate actions. In addition, security analysts may undertake investigations of events and/or meta-events. In general, such matters can be assigned to so-called cases. Stated differently, cases create a workflow and oversight environment for situations where there are suspicious events requiring further investigation. Once a case is created, it can be assigned to an operator, investigated, and resolved based on the business policies and practices of the enterprise (e.g., as documented in knowledge base 28). The security staff can also add narration and event information to a case, or view open cases to determine their status and any required next steps.

Consoles 16 also provide a front-end for the administration of the entire system 10. This may include system configuration such as setting up operators, notification, agent behavior, etc. User management (such as creating and modifying users, access, roles, and responsibilities), rules management (e.g., authoring, viewing, and updating rules), and workflow management (e.g., setting up the flow of actions taken when an event is received) may also be handled through the consoles 16. Finally, the consoles 16 allow for remote access, thus supporting divisional responsibility and "follow-the-sun" management.

Figure 4:
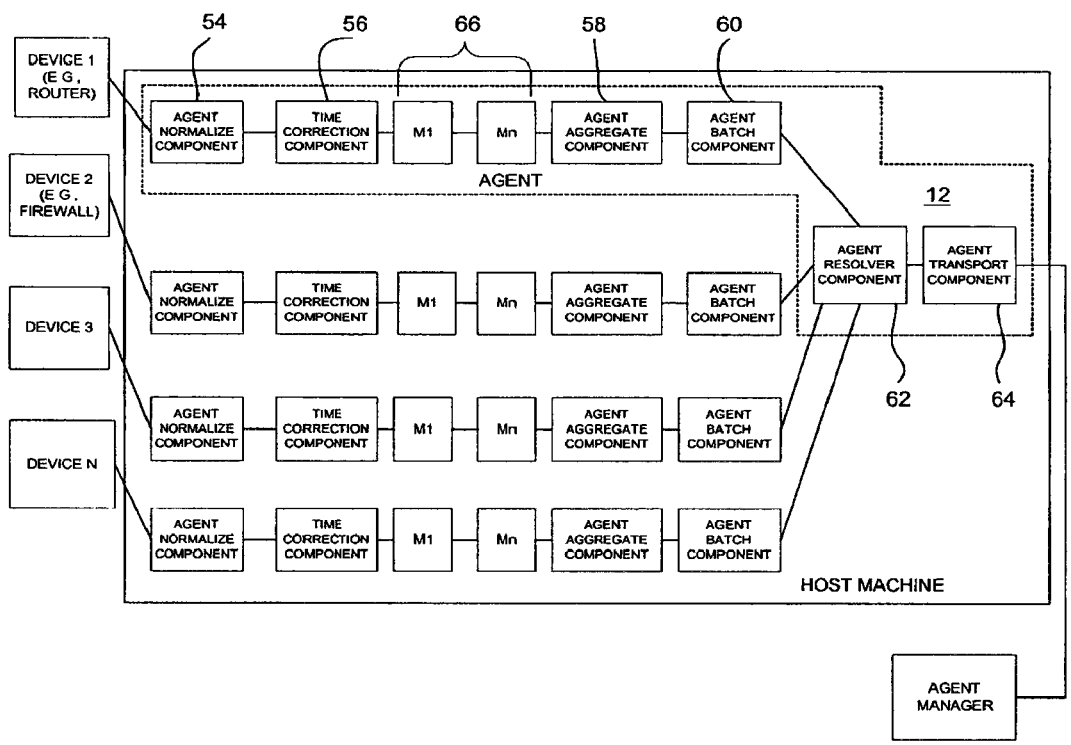
FIG. 4 illustrates the integration of multiple agents within a host machine in accordance with an embodiment of the present invention.
Figure 5:
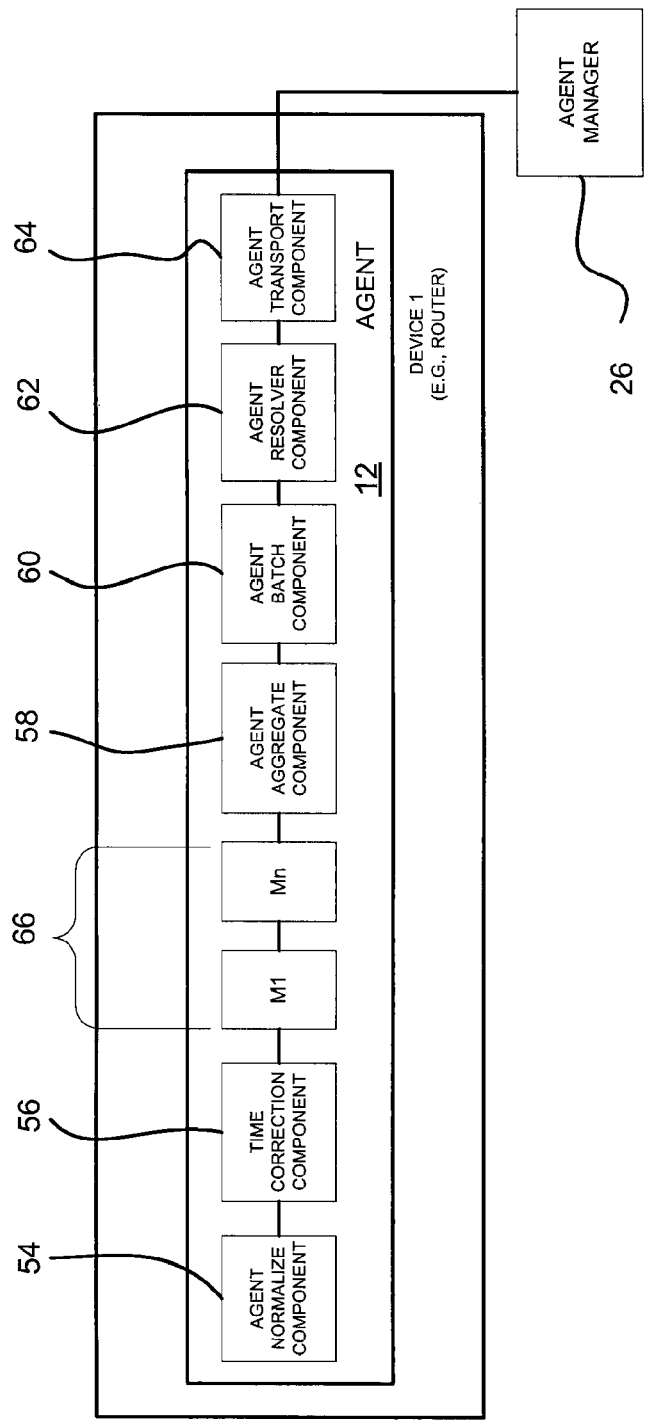
FIG. 5 illustrates the integration of an agent within a device (e.g., router) in accordance with an embodiment of the present invention.

The agents 12 described above are configurable by either manual process or via automatic processing. FIG. 4 illustrates the integration of multiple agents 12 within a host machine. FIG. 5 illustrates the integration of an agent 12 within a device (e.g., router). In the exemplary embodiment, the agent 12 may include a combination of components. The components are software modules developed using techniques and programming languages well known in the art. In one embodiment, the agent 12 includes an agent normalize component 54, a time correction component 56, an agent aggregate component 58, an agent batch component 60, an agent resolver component 62, an agent transport component 64, and multiple additional components 66. Use of any or all of these components is optional in any given implementation. Referring to FIG. 4, the agent resolver component 62 and agent transport component 64 may be shared by multiple agents within a host machine.

Associated with each agent 12 is a corresponding configuration file. In the exemplary embodiment the configuration file is a text file in which each line is an instruction to include a component (e.g., agent aggregate component 58) within an agent 12. It is through updating the instructions within the configuration file that agent 12 achieves modularity. In the exemplary embodiment an instruction may be added, deleted, or modified.

Moreover, the agent 12 is not limited to the components described above. In promoting the scalability and flexibility of the agent 12, additional components 66 may be created and included within the agent in future releases or according to customer requests/needs. As explained above the agent 12 may be configured manually. Thus, depending on the customers needs the agent 12 may be configured through manual entries by a user (e.g., via console/browser interface 16) or through an automated process. Such manual configuration may include merely modifying a configuration. In one embodiment, the configuration file is an ascii text file. Automated updates may include running a script file or any other technique well known in the art to update one or multiple agents. Moreover, the agent manager 26 may automatically update agents 12 based on analysis supported by the rules engine 18 and knowledge base 28.

The following is a description of each component named above:

Agent Normalize Component

Figure 6:
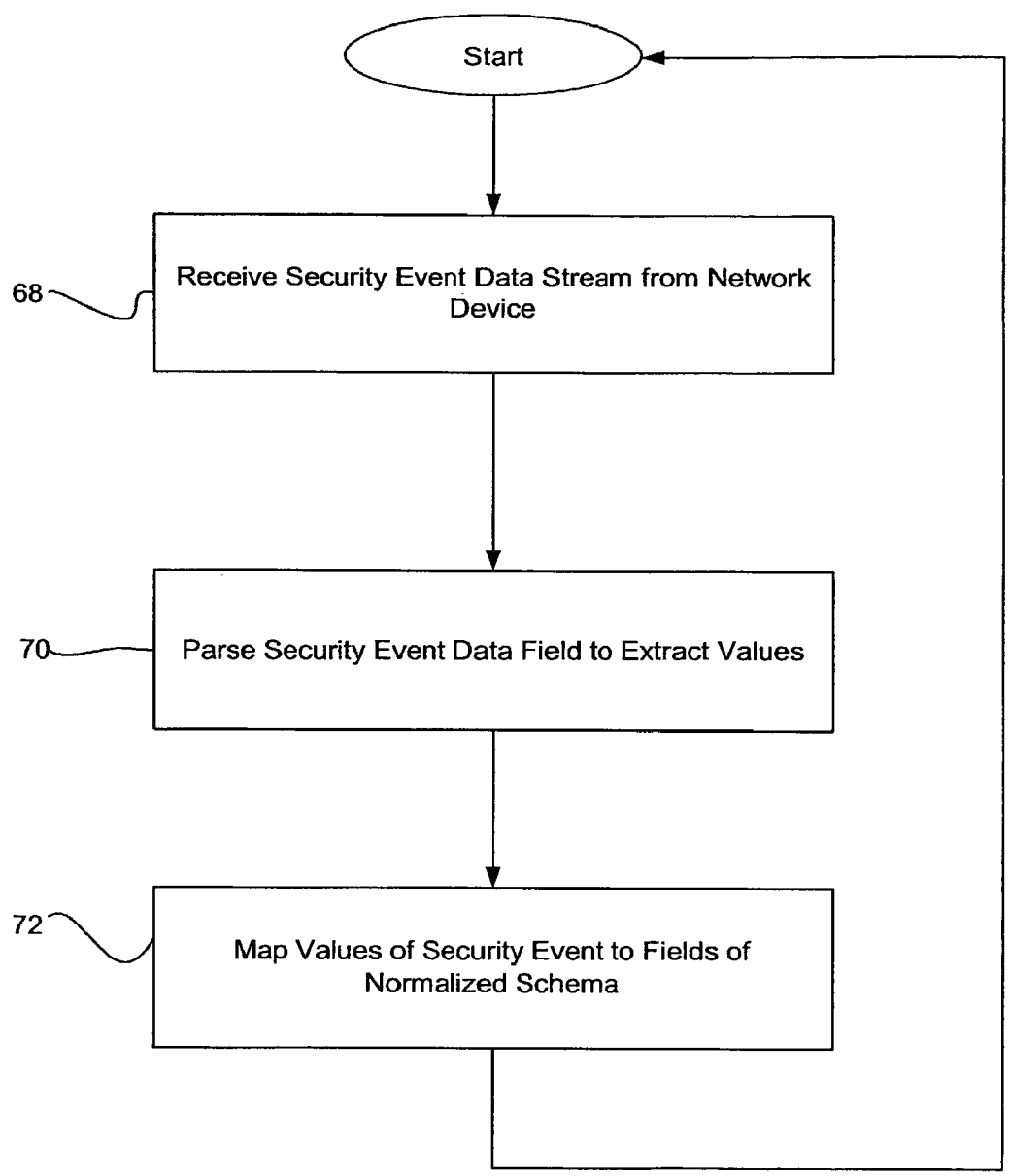
FIG. 6 illustrates operation of an agent normalize component in accordance with an embodiment of the present invention.

In one embodiment of the present invention, security events are first processed by the agent normalize component 54. The operation of the agent normalize component 54 is described with reference to FIG. 6. At block 68, the agent normalize component 54 receives the security event from the security device being monitored. This can involve the security device directly reporting the security event to the agent normalize component 54, the agent normalize component 54 accessing some shared memory space, or the agent normalize component 54 gaining access to the security event in any other channelized fashion.

The security event, as received, is an event data stream characterized by several values that need to be parsed and extracted. The data stream and the values contained therein are in the format of the network device that generated the event. Some example data streams are given above for an example event as reported by a Check Point firewall, a Cisco Systems router, a Cisco Systems PIX firewall, and the Snort IDS.

In block 70, the normalize component 54 parses the received event record for these values. The parser is configured to be able to determine the type of event from the data field and to extract and interpret the values based on this determination. That is, the parser is configured to interpret the syntax, semantics, type and format of the reported event to extract the values.

In one embodiment, the parser is implemented using a descriptor file that is declaratively configurable. That is, the descriptor file contains declarative statements, such as Regular Expressions, that are interpreted as a high-level language. The descriptor file contains all possible formats for security events reported by the monitored network device. Thus, the received event data stream can be matched to the possible event types, and the key values can be extracted and interpreted to create a parsed event that is organized by values. Such a parser is configurable without programming language coding, thus improving the flexibility of the agents.

The extracted values are then used to populate the fields of the normalized schema. The schema population is done at block 72, where the Agent normalize component 54 maps the extracted values to various fields of the normalized schema to create a normalized event that the system can use to correlate with other normalized events from heterogeneous network devices. In one embodiment, the mapping is content based, rather than semantic based, to increase the efficiency of the normalized schema and to aid in correlating the heterogeneous events. For example, in the demonstration of Table 2 above, no matter where or in what format the value for the target port appeared in the event log, the value was always mapped to the Tgt_Port field of the normalized schema because all the values had the same content.

Figure 7:
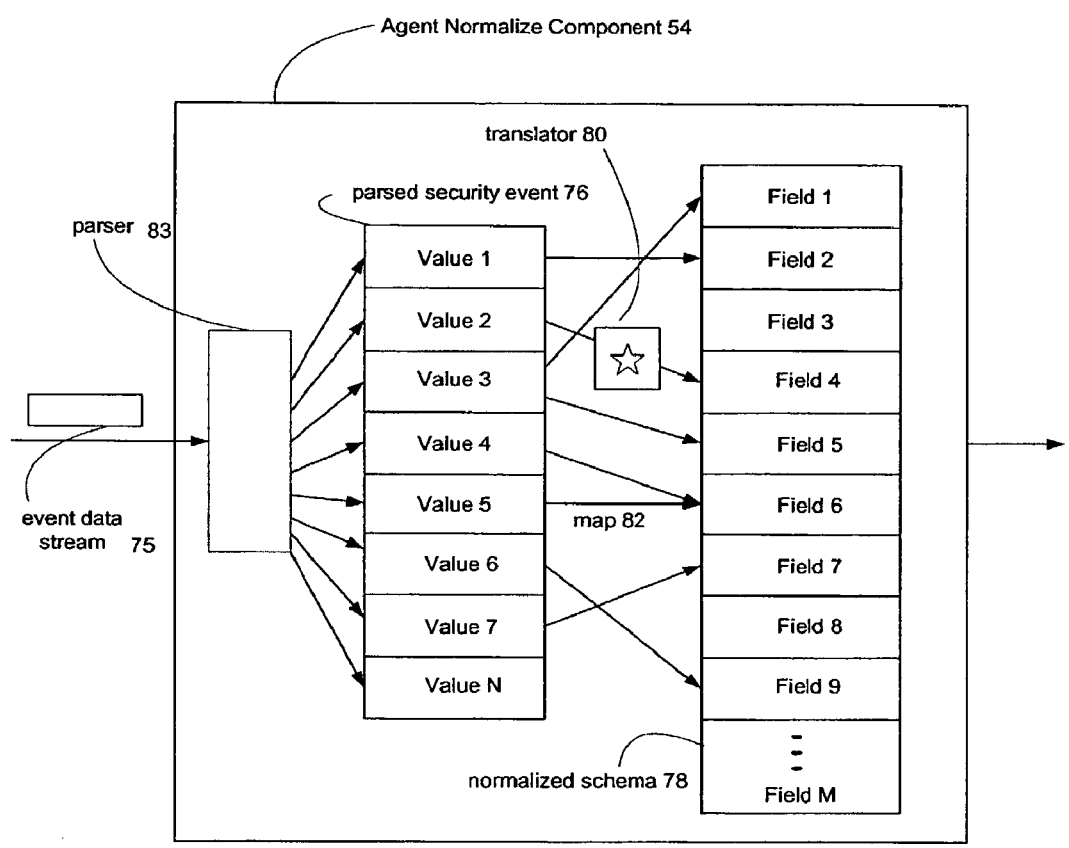
FIG. 7 illustrates an agent normalize component in accordance with an embodiment of the present invention.

Embodiments of the agent normalize component 54 are further described with reference to FIG. 7. A security event in the form of an event data stream 75 is parsed by the parser 83 to create a parsed security event 76 that can be mapped to a normalized schema 78. The event data stream 75 is raw event data.

The parser is configured to identify the kind of event represented by the raw event data and interpret the values contained in the event stream. For example an event data stream such as "User logged in from 10.10.10.10" can be parsed into "source: User," "action: logged in," "source IP: 10.10.10.10." The event can be identified as a log in type event by matching an expression such as "* logged in from *." In one embodiment the parser 83 is implemented declaratively using Regular Expression.

The values of the parsed security event 76 are then used to populate the fields of a normalized event conforming to the normalized event schema 78. Map 82 performs this mapping. For example, map 82 populates Field 2 of the normalized schema 78 with Value 1 of the parsed security event 76. In other words, map 82 maps Value 1 to Field 2.

Map 82 can perform simple mapping, such as the mapping of Value 1 to Field 2. For example, with reference to Table 2 above, the target IP value reported by the Check Point firewall was used to populate the Tgt_IP field of the normalized schema. Furthermore, map 82 can use a translator 80 to compensate for any semantic differences between the values as reported by the network device and the semantics used by the normalized schema. For example, the Check Point firewall value or "www-http" was translated to "80" when mapped to the Trg_Port field in Table 2. The translator 80 can be implemented using a lookup table or any other means for mapping.

The translator 80 can also perform other functions, such as value scaling. For example, if Value 2 represented the seriousness of the security event as determined by the network device, this seriousness may be on a different scale than the one used by the normalized schema 78. In one embodiment, the normalized schema 78 uses four severity levels: low, medium, high, and very high.

Thus, if the scale used by the network device has eight levels, one possible severity mapping would map severity level 1-2 to low, 3-4 to medium, and so on. However, other mappings may be more appropriate depending on the network device. For example, if a network device overrates the seriousness of events as compared to other heterogeneous network devices, its reported severity may be mapped to lower severity levels to normalize the severities in relation to these other network devices.

Furthermore, map 82 can also map one value to any number of fields. This is demonstrated in FIG. 7 by Value 3 being used to populate both Field 1 and Field 5. For example, the seriousness of the security event can be mapped through a translator 80 that performs the severity mapping, and can also mapped unaltered, that is as originally reported by the network device, to another field to preserve all the values contained in the security event.

Similarly, any number of values can be mapped to a single field where multiple values are needed to fully populate the field. This is demonstrated in FIG. 7 by Value 4 and Value 5 both being used to populate Field 6. For example, a timestamp may need to be assembled from a time value and a date value. Similarly, an IP address may be assembled from two values, each containing an octet.

The normalized event conforming to the normalized schema 78 can have various fields. Some example fields are given by Table 2.

Furthermore, there are many ways to implement map 82. In one embodiment, the map 82 depends on the values of the received security event, which in turn depends on the type of network device the agent 12 is monitoring.

In one embodiment, all values are used to populate the fields of the normalized schema 78. However, in other embodiments, certain values may not be mapped, or mapped only after passing through a translator 80. After the map 82 is performed, the normalized event conforming to the normalized schema 78 can be sent for further processing, such as aggregation, batching, transport, and correlation.

The time correction component 56 will now be described. The time correction component 56 can correct agent time and correct detect time.

Agent Aggregate Component

Figure 8:
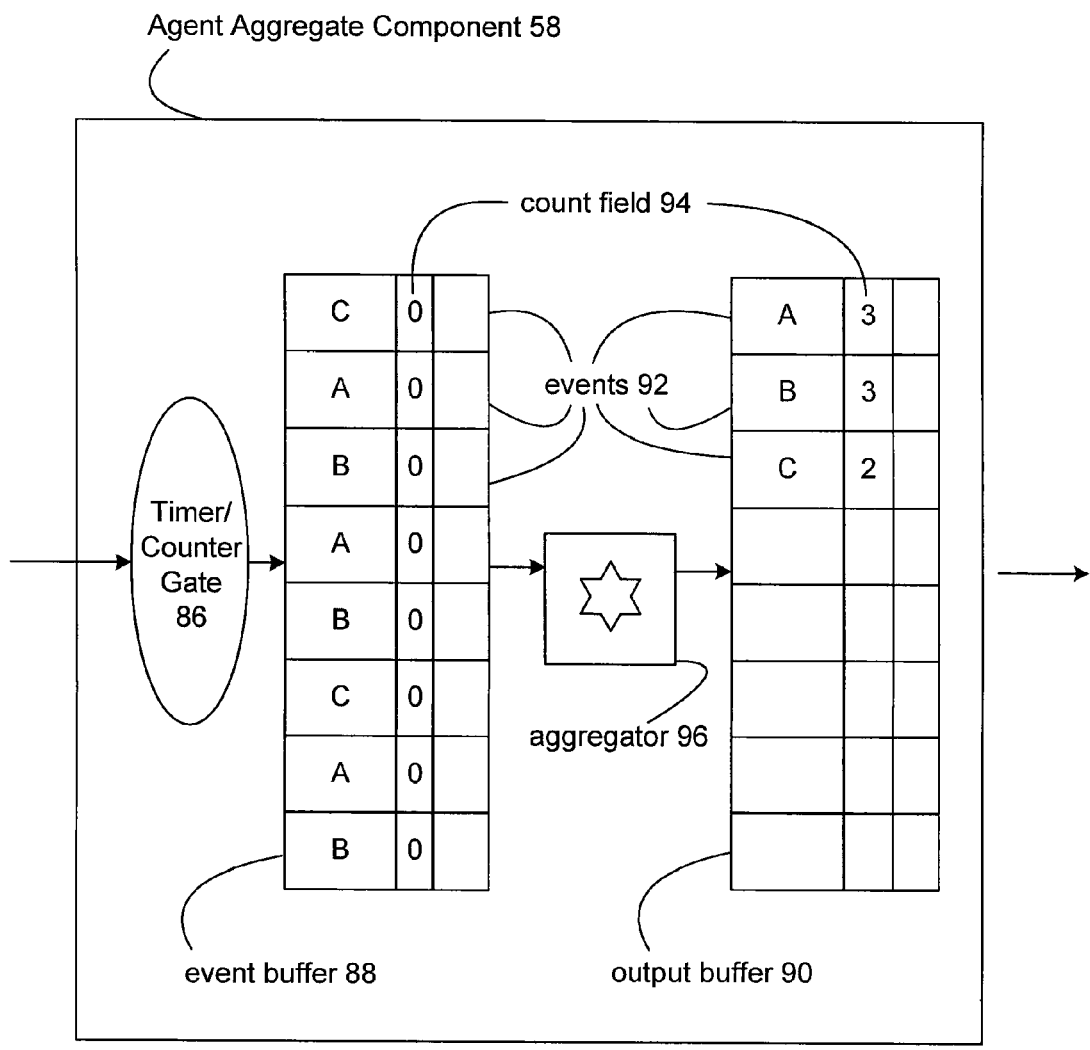
FIG. 8 illustrates an agent aggregate component in accordance with an embodiment of the present invention.

One embodiment of the agent aggregate component 58 is now described with reference to FIG. 8. As shown in FIG. 8, events 92 get stored in the event buffer 88 of the agent aggregate component 58 through the operation of a timer/counter gate 86. In one embodiment, the events 92 have already been normalized by the agent normalize component 54 to aid the aggregation process.

One of the fields of the normalized schema used by these normalized events 92 is a count field 94 that indicates how many times an event was received. Prior to aggregation, this count field 94 can be initialized to indicate that the event has not yet gone through aggregation. In one embodiment, the count field 94 is initialized to zero.

In one embodiment, the timer/counter gate 86 is implemented as a counter that counts the number of events 92 entering the agent aggregate component 58. For example, the counter can be configured to fill the event buffer 88 with 30 events at a time. In another embodiment, the timer/counter gate 86 is implemented as a timer that lets events through for a period of time. For example, the timer can be configured to collect events 92 in the event buffer 88 for 5 minutes.

When the timer/counter gate 86 indicates that the event buffer 88 is ready for aggregation, e.g. when the counter reaches a predetermined number or when the timer expires, the events 92 in the event buffer 88 are passed to the aggregator 96. The function of the aggregator 96 is to count the number of identical events in the event buffer 88 and to output each distinct event only once with the count field 94 indicating the number of times identical events were aggregated.

In FIG. 8, the events 92 labeled with the same letter symbolize identical events, and the events labeled with different letters symbolize distinct events. Thus, in the example of FIG. 8, aggregator 96 had recorded the events C,A,B,A,B,C,A,B and aggregated them to output event A,B,C to the output buffer 90. FIG. 8 also shows that the aggregator 96 has changed the count field 94 of these events 92 from their initial values of zero, to the appropriate aggregated count for the distinct events. Thus, e.g., event A has a count field of three.

The events 92 in the output buffer 90 can then be sent for further processing, such as batching and correlation. As illustrated in FIG. 8, the output buffer uses less than half of the memory that the input buffer uses. This conserves memory and reduces the bandwidth required for sending the events 92 to the manager 14.

In one embodiment, the aggregator 96 determines which events are identical based on a set of key fields.

In one embodiment, the field indicating the time of the event is excluded from this set of fields compared, since identical events may be reported at different times. This type of aggregation does not preserve the precise time for all identical events, but does provides the highest degree of efficiency. In one embodiment, the aggregator can note the earliest and the latest time for each identical event, and fill in fields, e.g., an event_start and an event_end field, in events 92 to that effect.

For one set of identical events, such as the events labeled A, after the aggregator 96 determines which events 92 belong in the set, the aggregator 96 outputs a single occurrence of the identical events. For that single occurrence, the aggregator 96 updates the count field 94 of the event to reflect the number of identical events in the set.

The output of the aggregator 96 is shown in FIG. 8 to be placed in an output buffer 90 until all events 92 in the event buffer 88 have been aggregated. However, the aggregated events 92 being output from the aggregator 96 can be sent directly for further processing.

The security events can next be processed by the agent batch component 60. The agent batch component 60 performs the batching of security events into event batches to be transmitted. Since there is a certain amount of overhead associated with transmitting events from an agent to the agent manager 26, such as transport protocol overhead and system communication overhead, it can improve overall performance of the network security system to batch security events prior to sending them to the security manager, or other further processing.

The batching can be done according to a configurable time limit, e.g. transmitting a batch every twenty minutes, or according to a number limit, e.g. transmitting a batch when a hundred security events are received and collected. The batching can be simple or prioritized.

The agent resolver component 62 will now be described. The agent resolver component 62 is utilized to fill in incomplete address descriptions on event. Also, the agent resolver component 62 performs reverse DNS lookups to resolve hostnames and domains to INET address. In addition, the agent resolver component 62 performs DNS lookups to resolve hostnames and domains to INET address.

The agent 12 also includes an agent transport component 64. The agent transport component 64 is where messages transmitted to the agent manager 26 exit the agent 12 and messages transmitted from the agent manager 26 enter the agent 12.

Figure 9A:
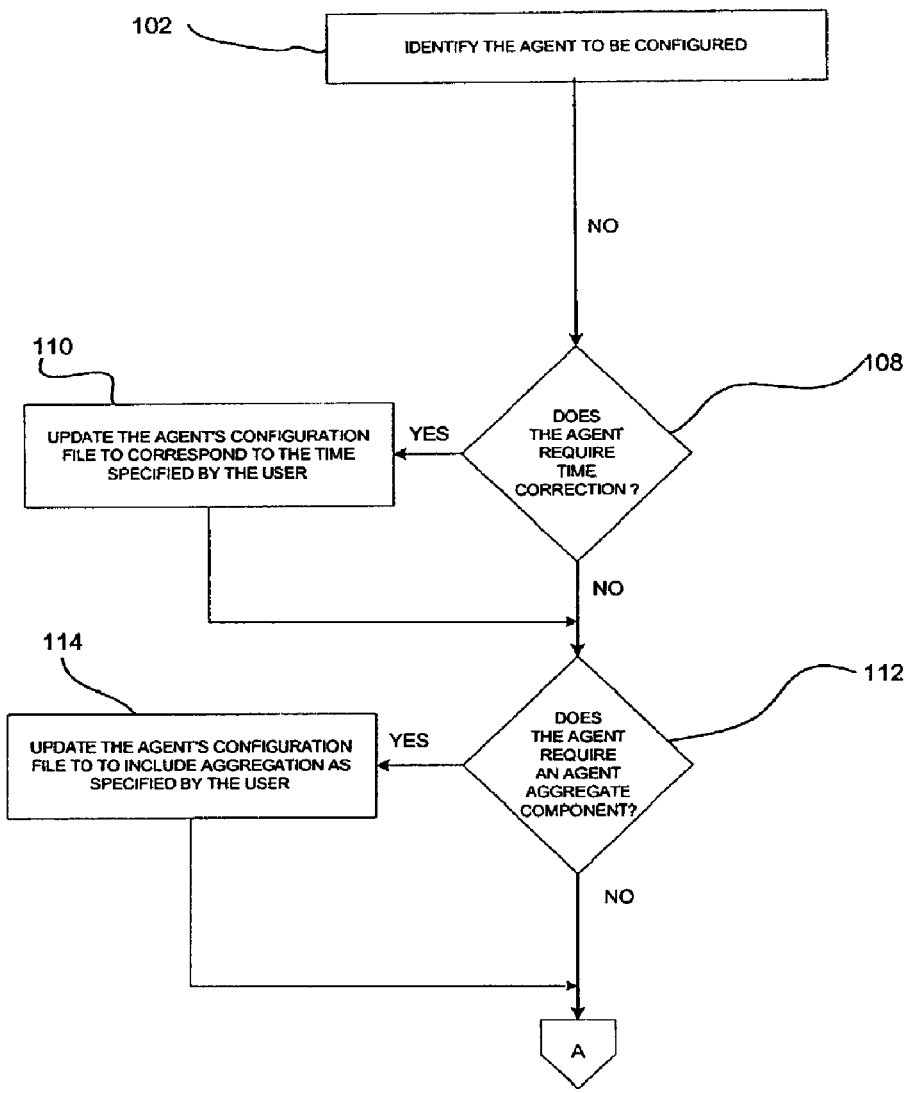
FIG. 9 is a flow chart illustrating a method, according to one embodiment of the invention, of configuring a software agent.
Figure 9B:
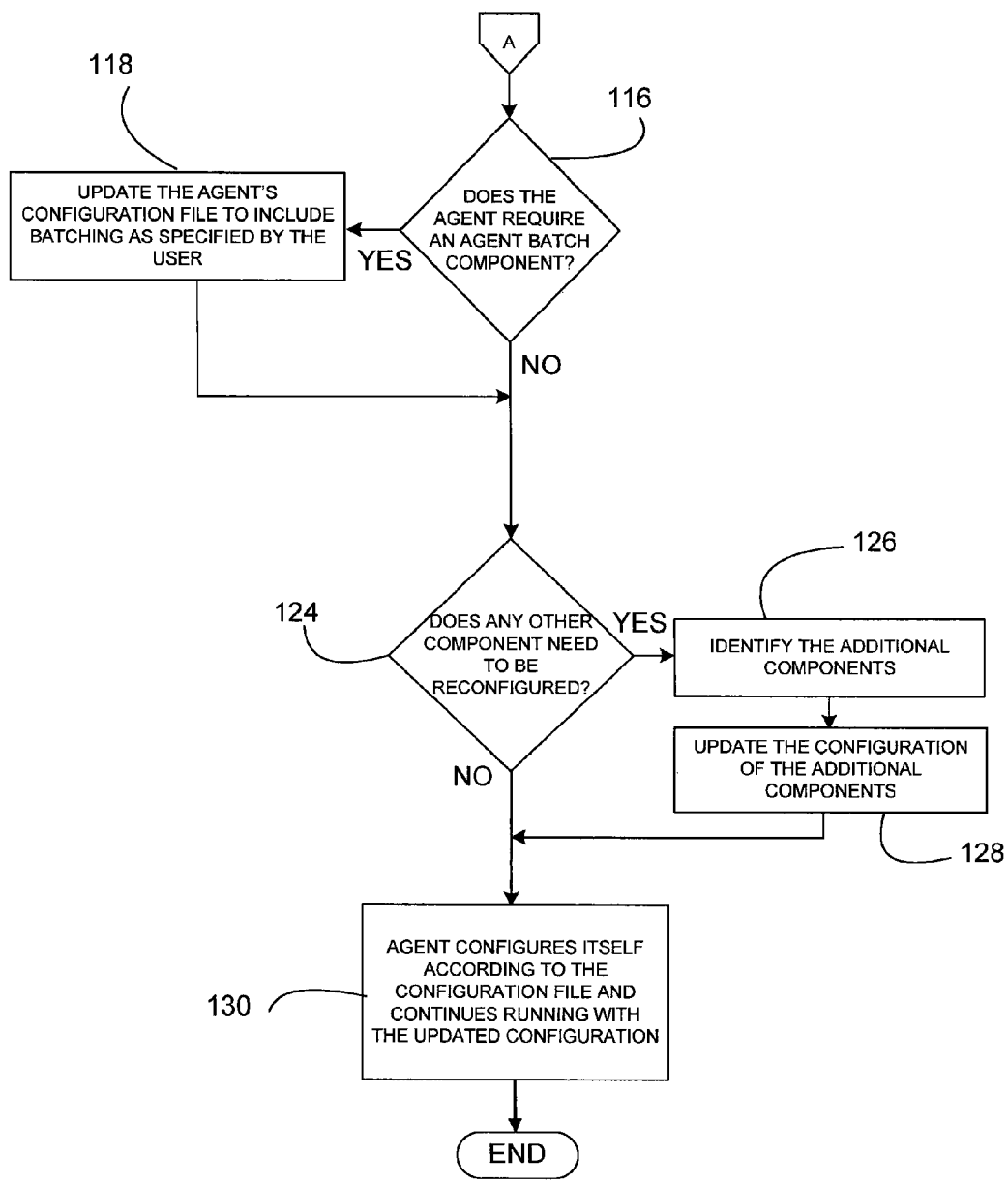

FIG. 9 is a flow chart illustrating a method 100, according to one embodiment of the invention, of configuring an agent 12. The agent 12 is modular in that the agent may be manually configured by user (e.g., at console/browser 16) with multiple different types of components. Furthermore, the agent 12 may be manually modified by a user (e.g., at console/browser 16) after it has been deployed. At block 102 the identity of an agent 12 to be configured is identified. In the exemplary embodiment, the agent is configured as a result of manual processing.

At block 108, a determination is made as to whether the agent 12 requires time correction. Similar to the description above, the decision is entered by a user and applied via console/browser 16.

At block 110, if the user does want to include a time correction component 56, manager 26 communicates via the network with agent 12, and uploads the necessary configuration information needed to update the configuration file associated with agent 12.

At block 112, a determination is made as to whether the agent 12 requires aggregation within the agent 12.

At block 114, if the user does want to include aggregation, manager 26 communicates via the network with agent 12 and uploads the necessary configuration information needed to update the configuration file associated with agent 12.

At block 116, a determination is made as to whether the agent 12 requires batching within the agent 12.

At block 118, if the user does want to include batching within the agent 12, manager 26 communicates via the network with agent 12 and uploads the necessary configuration information needed to update the configuration file associated with agent 12.

At block 124, a determination is made as to whether any other components within the agent 12 need to be reconfigured. At block 126, the additional components 66 are identified. At block 128, manager 26 communicates via the network with agent 12 and uploads the necessary configuration information needed to update the configuration file associated with agent 12.

At block 130 the agent 12 configures itself according to the configuration file and begins running with the updated configuration.

While method 100 provided for a user stepping through a process in which a decision is made about each of a multiple of components, the user is not required to follow such a process. For example, a user may simply modify the time correction component 56 of an agent 12 via the console/browser interface 16. In response, the configuration file associated with the agent is updated at manager 14 and the agent 12 configuration information is sent by agent manager 26 to agent 12. Agent 12 updates its configuration according to the configuration information it receives from agent manger 26. Thus, through entries made at console/browser interface 16 users may create or modify agents 12 without making source code changes. Such entries for example may include simply selecting components (e.g., agent aggregate component 58) from drop down lists. In one embodiment the agent is restarted in order for the changes to take effect.

Figure 10:
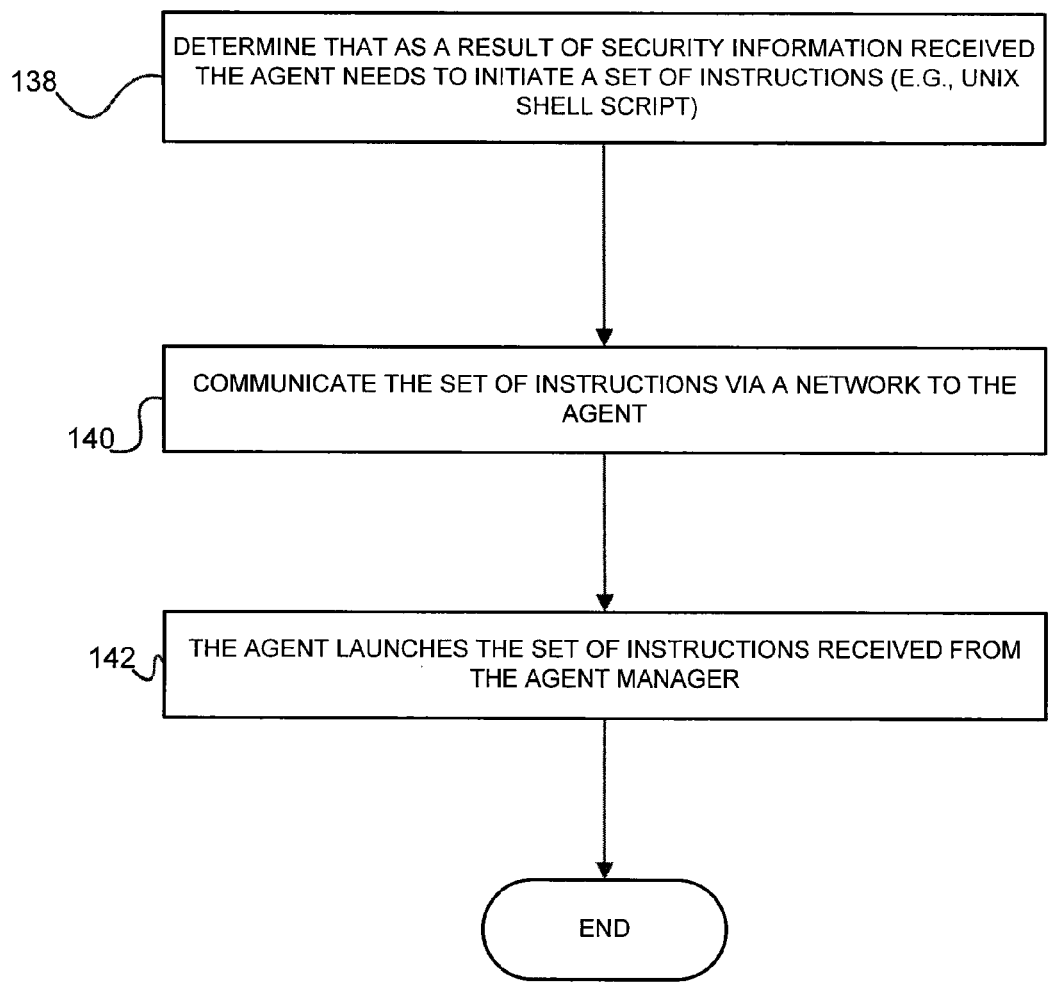
FIG. 10 is a flow chart illustrating a method, according to one embodiment of the invention, of automatically altering the operation of a software agent.

FIG. 10 is a flow chart illustrating a method 136, according to one embodiment of the invention, of automatically altering the operation of an agent 12.

At block 138, manager 14 determines that as a result of security information received the agent needs to initiate a set of instructions (e.g., UNIX shell script) in response.

At block 140, agent manager 26 communicates the set of instructions via a network to agent 12.

At block 142, the set of instructions are received by agent 12 and initiated according to the direction of the agent manager 26.

Bi-Directional Communication

Figure 11:
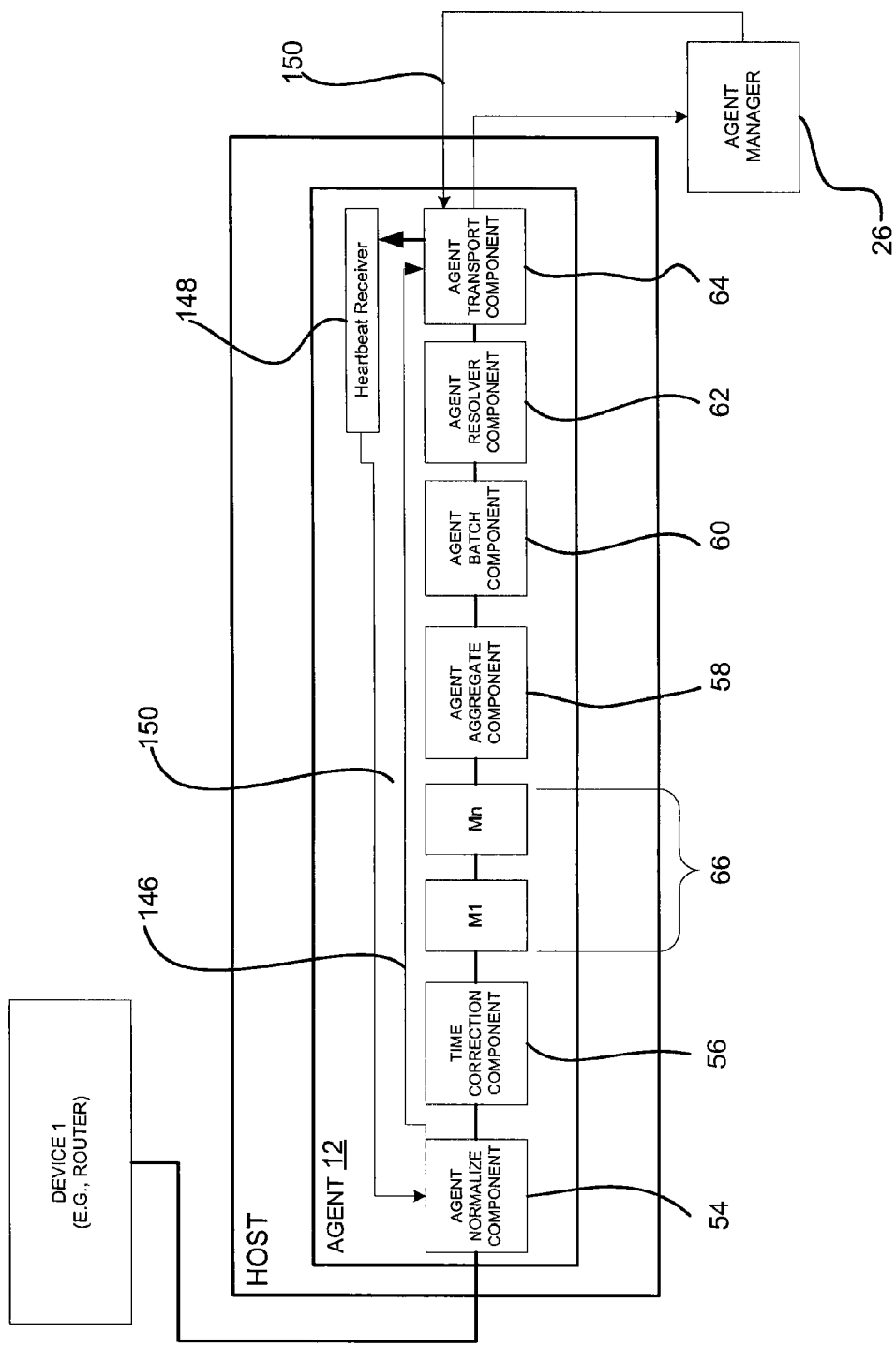
FIG. 11 is a diagrammatic representation of bi-directional communication between a software agent within a host and an agent manager.

FIG. 11 is a diagrammatic representation of bi-directional communication between an agent 12 within a host and an agent manager 26. In addition to the components described in FIGS. 4 and 5 earlier, a heartbeat send path 146 is shown. The heartbeat send path 146 provides a section of the route that heartbeat messages will take during transmission from an agent 12 to an agent manager 26. Also, a heartbeat response message path 150 is shown as the route that the heartbeat response message from the agent manager 26 to the agent 12 will take. Included within the heartbeat response message path 150 is a heartbeat receiver 148. A heartbeat message is a type of message sent from an agent 12 to an agent manager 26 to determine if changes need to be made to the agent 12 or if the agent 12 needs to take other actions (e.g., launch a UNIX shell script).

Figure 12:
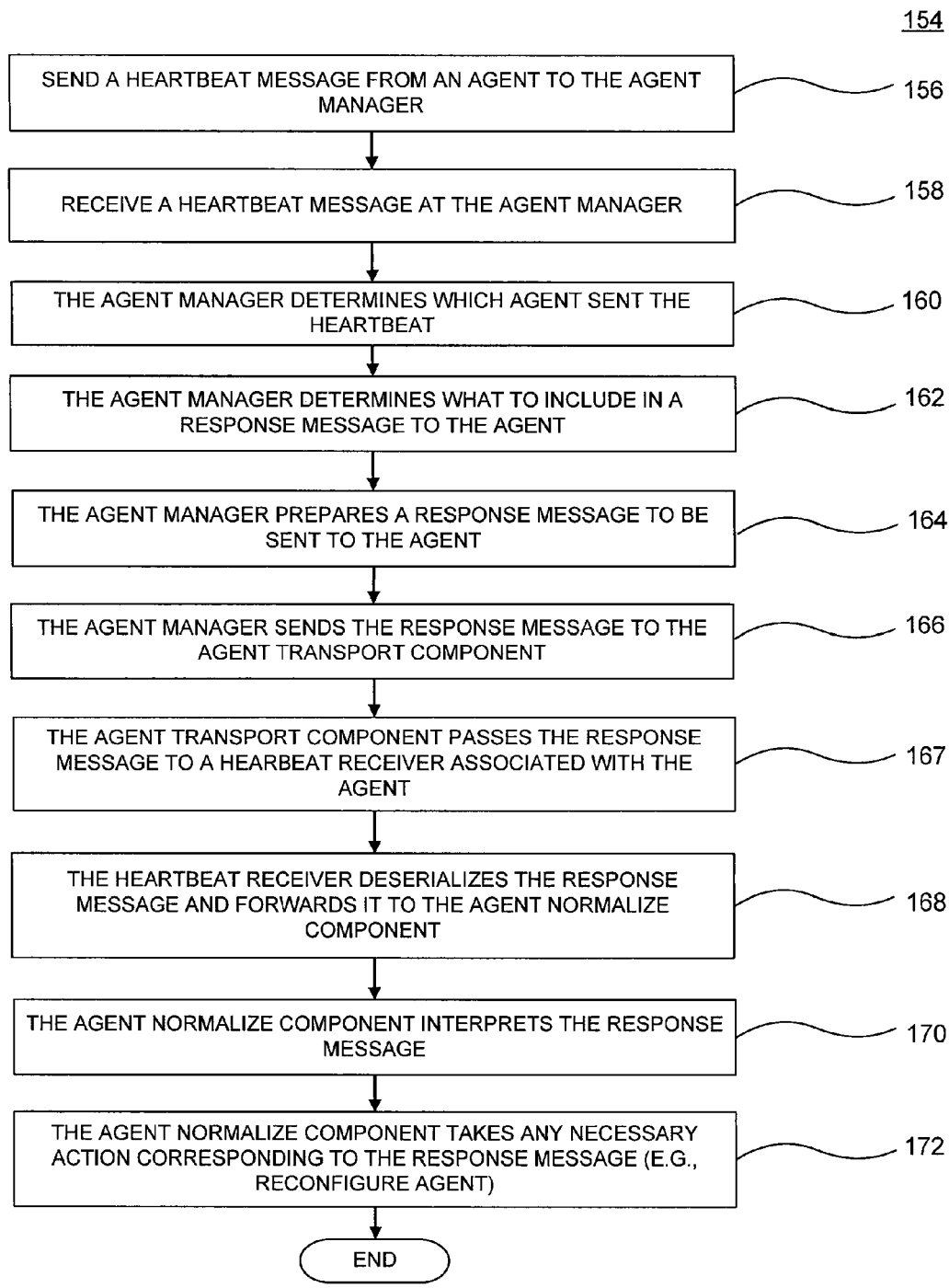
FIG. 12 is a flow chart illustrating a method, according to one embodiment of the invention, showing bi-directional communication between a software agent and an agent manager.

FIG. 12 is a flow chart illustrating a method 154, according to one embodiment of the invention, showing bi-directional communication between an agent 12 and an agent manager 26.

At block 156, a heartbeat message is sent from an agent 12 to the agent manager 26. The interval of time between which heartbeat messages are sent is configurable and may be set in the agent 12 configuration file (e.g., one heartbeat message every ten seconds). In the exemplary embodiment, the heartbeat message is sent from the agent normalize component 54 via the heartbeat send path 146 to the agent transport component 64. The agent transport component 64 then forwards the heartbeat message (e.g., via the HTTP protocol) to the agent manager 26.

At block 158, the agent manager 26 receives the heartbeat message. At block 160, the agent manager 26 determines which agent 12 sent the heartbeat message. In the exemplary embodiment, the agent manager 26 makes this determination by comparing a unique identifier included within the heartbeat message against a table of identifiers. The table of identifiers includes a unique identifier for each agent 12 associated with the agent manager 26.

At block 162, the agent manager 26 determines what (e.g., commands, instructions, etc.) to include in a response message to the agent 12. The agent manager 26 makes the determination based on user initiated instructions (e.g., configuration updates), and rules included within the rules engine 18. An example of user initiated instructions may be instructions requesting that the agent aggregate component 58 be removed from the agent. In the exemplary embodiment, the user would enter instructions via the console/browser interface 16. The instructions are then forwarded to the agent manager 26, where they will be included within a response message to the agent. While the example describes user initiated instructions to reconfigure the agent 12, user initiated instructions include any instructions to alter the configuration or alter the actions of the agent 12.

The rules engine relies on a variety of factors, including previous event data received from the agent 12, the current security level, and user settings. An example of how the rules engine 18 affects what is included in a response message may be the automatic generation of a set of instructions (e.g., UNIX shell script, LINUX shell script, Windows batch file, etc.) in response to criteria meeting conditions in the rules engine 18. Such a set of instructions in one example might tell a firewall to shut down a communications port.

At block 164, the agent manager 26 prepares the response message to be sent to the agent 12. The response message includes commands to launch the instructions determined at block 162. In the exemplary embodiment, the commands include pause, stop, restart, reconfigure, and a command to launch the automatically generated instructions discussed above. The pause command prevents the transmission of events to the agent manager 26. However, the pause command does not prevent the processing of events. The stop command prevents the receipt of events at the agent manager 26 from the agent 12. But the heartbeat messages from the agent 12 to the agent manager 26 will continue after a stop command has been initiated. The restart command allows previously stopped events to be received, processed, and transmitted from the agent 12 to the agent manager 26 once again. The reconfiguration command alters the configuration of an agent 12, and includes the user initiated instructions entered at block 162. The reconfiguration command provides for adding, deleting, or modifying instructions within an agent 12 configuration file.

At block 166, the agent manager 26 sends (e.g., via the HTTP protocol) the response message to the agent transport component 64. In the exemplary embodiment, the response message is sent back via the same port through which the heartbeat message was received. The same path is used to send heartbeat messages and response messages resulting in bi-directional communication between agents 12 and the agent manager 26. At block 167, the agent transport component 64 passes the response message to a heartbeat receiver 148 associated with the agent 12.

At block 168, the heartbeat receiver 148 deserializes the response message and forwards it to the agent normalize component 54. Through deserialization, the message is converted into an object which is intelligible by the agent normalize component 54. At block 170, the agent normalize component 54 interprets the response message to determine if any commands or configuration control information was included in the response message.

At block 172, the agent normalize component 54 takes any necessary action (e.g., pause, stop, restart, reconfigure, configuration controls, etc.) corresponding to the response message. For example, the response message may include a configuration command and the necessary configuration information. The configuration may for example request that the instruction to include the agent aggregate component 58 in the agent 12 configuration file is to be deleted.

Thus, updateable modular software agents utilized in a computer-based system for capturing, correlating and reporting security events from heterogeneous sources have been described. In the foregoing description, the various examples and embodiments were meant to be illustrative of the present invention and not restrictive in terms of their scope. Accordingly, the invention should be measured only in terms of the claims, which follow.

The invention claimed is:

1. A computer-implemented method comprising:
parsing an event that was generated by a first device;
creating a normalized event based on the parsed event;
accessing a first machine-readable medium encoded with a plurality of software modules, wherein each software module is configured to receive a normalized event, to modify the normalized event, and to output the modified normalized event;
modifying the normalized event using a set of software modules, wherein the set of software modules comprises two or more software modules of the plurality of software modules and does not comprise all of the plurality of software modules; and
transmitting the modified normalized event to a second device;
wherein a configuration file indicates which software modules of the plurality of software modules are in the set of software modules, and wherein the configuration file is stored on a second machine-readable medium.

2. The method of claim 1 wherein the first device comprises a network device.

3. The method of claim 1 wherein the event comprises a security event.

4. The method of claim 1 wherein the configuration file comprises an ASCII (American Standard Code for Information Interchange) text file.

5. The method of claim 1 wherein the second device includes the second machine-readable medium.

6. The method of claim 1 further comprising receiving the event from the first device in a format specific to the first device.

7. The method of claim 1 further comprising transmitting the modified normalized event to the second device in a format not specific to the first device.

8. The method of claim 1 wherein the set of software modules comprises a time correction software module that is configured to modify a normalized event by modifying an agent time within the normalized event or by modifying a detect time within the normalized event.

9. The method of claim 1 wherein the set of software modules comprises an aggregate software module that is configured to modify a normalized event by modifying a count field within the normalized event.

10. The method of claim 1 wherein the set of software modules comprises a resolver software module that is configured to modify a normalized event by modifying an address description within the normalized event.

11. The method of claim 1 wherein the set of software modules comprises a batch software module.

12. The method of claim 1 wherein the set of software modules comprises a transport software module.

13. The method of claim 1, further comprising:
receiving an event from a third device, modifying the event received from the third device using a second set of software modules, and transmitting the modified event to the second device, wherein the second set of software modules comprises two or more software modules of the plurality of software modules;
wherein a second configuration file indicates which software modules of the plurality of software modules are in the second set of software modules.

14. The method of claim 13 wherein the second configuration file is stored on the second machine-readable medium.

15. The method of claim 1 further comprising supporting a set of commands.

16. The method of claim 15 wherein the set of commands comprises a command to add a software module to the set of software modules.

17. The method of claim 15 wherein the set of commands comprises a command to remove a software module from the set of software modules.

18. The method of claim 15 wherein the set of commands comprises a command to send a signal to the first device.

19. The method of claim 1 further comprising receiving a command from the second device.

20. The method of claim 19 wherein the command was initiated by a user.

21. The method of claim 19 wherein the command was generated by a rules engine.

22. A system comprising:
a processor; and
a first machine-readable medium encoded with:
- a plurality of software modules, wherein each software module is configured to receive a normalized event, to modify the normalized event, and to output the modified normalized event; and
- software agent instructions that cause the processor to perform instructions comprising:
  - parsing an event that was generated by a first device;
  - creating a normalized event based on the parsed event;
  - modifying the normalized event using a set of software modules,
    - wherein the set of software modules comprises two or more software modules of the plurality of software modules and does not comprise all of the plurality of software modules; and
  - transmitting the modified normalized event to a second device;
- wherein a configuration file indicates which software modules of the plurality of software modules are in the set of software modules, and wherein the configuration file is stored on a second machine-readable medium.

23. A machine-readable medium encoded with:
a plurality of software modules, wherein each software module is configured to receive a normalized event, to modify the normalized event, and to output the modified normalized event; and
software agent instructions that, when executed by a processor, cause the processor to perform instructions comprising:
- parsing an event that was generated by a first device;
- creating a normalized event based on the parsed event;
- modifying the normalized event using a set of software modules, wherein the set of software modules comprises two or more software modules of the plurality of software modules and does not comprise all of the plurality of software modules; and
- transmitting the modified normalized event to a second device;
wherein a configuration file indicates which software modules of the plurality of software modules are in the set of software modules, and wherein the configuration file is stored on a second machine-readable medium.

* * * * *